(12) United States Patent
Kim et al.

(10) Patent No.: US 9,459,680 B2
(45) Date of Patent: Oct. 4, 2016

(54) SYSTEM ON CHIP AND TEMPERATURE CONTROL METHOD THEREOF

(71) Applicant: SAMSUNG ELECTRONICS CO., LTD., Suwon-si (KR)

(72) Inventors: Hyungock Kim, Seoul (KR); Wook Kim, Yongin-si (KR); Jun Seomun, Seoul (KR); Chungki Oh, Yongin-si (KR); JaeHan Jeon, Seoul (KR); Kyungtae Do, Changwon-si (KR); JungYun Choi, Hwaseong-si (KR); Hyosig Won, Suwon-si (KR); Kee Sup Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 237 days.

(21) Appl. No.: 13/948,691

(22) Filed: Jul. 23, 2013

(65) Prior Publication Data

US 2014/0032949 A1    Jan. 30, 2014

(30) Foreign Application Priority Data

Jul. 26, 2012 (KR) ........................ 10-2012-0081855

(51) Int. Cl.
 *G06F 1/32* (2006.01)
 *G05D 23/19* (2006.01)
 *G06F 1/20* (2006.01)

(52) U.S. Cl.
 CPC ......... *G06F 1/3206* (2013.01); *G05D 23/1919* (2013.01); *G06F 1/20* (2013.01); *G06F 1/324* (2013.01); *Y02B 60/1217* (2013.01)

(58) Field of Classification Search
 CPC ........ G06F 1/3206; G06F 1/20; G06F 1/324; G05D 23/1919; Y02B 60/1217
 See application file for complete search history.

(56) References Cited

U.S. PATENT DOCUMENTS 5,955,793 A * 9/1999 Khadkikar et al. ............ 307/117
6,415,388 B1 * 7/2002 Browning et al. ............ 713/322

(Continued)

FOREIGN PATENT DOCUMENTS

| CN | 1757008 A | 4/2006 |
|----|-----------|--------|
| CN | 1926439 A | 3/2007 |

(Continued)

*Primary Examiner* — M Elamin
(74) *Attorney, Agent, or Firm* — Sughrue Mion, PLLC

(57) ABSTRACT

A temperature control method of a semiconductor device is provided. The temperature control method includes detecting a temperature of the semiconductor device; activating a reverse body biasing operation in which a body bias voltage applied to a function block of the semiconductor device is regulated, when the detected temperature is greater than a first temperature level; and activating a thermal throttling operation in which at least one of a frequency of a driving clock provided to a function block of the semiconductor device and a driving voltage applied to the function block of the semiconductor device is regulated, when the detected temperature is greater than a second temperature level that is different than the first temperature level.

31 Claims, 19 Drawing Sheets

(56) References Cited

U.S. PATENT DOCUMENTS

| | | | |
|---|---|---|---|
| 6,717,530 B1* | 4/2004 | Schmidt et al. | 340/870.17 |
| 6,895,515 B1 | 5/2005 | Yamazaki | |
| 7,721,128 B2 | 5/2010 | Johns et al. | |
| 8,304,698 B1* | 11/2012 | Tischler | 219/497 |
| 8,308,359 B2* | 11/2012 | Walker | 374/176 |
| 8,497,453 B2* | 7/2013 | Walker | 219/502 |
| 8,793,512 B2* | 7/2014 | Branover | G06F 1/206 327/512 |
| 2002/0029352 A1 | 3/2002 | Borkar et al. | |
| 2003/0037274 A1 | 2/2003 | Shikata et al. | |
| 2004/0111231 A1 | 6/2004 | Ando | |
| 2004/0128631 A1 | 7/2004 | Ditzel et al. | |
| 2005/0192773 A1 | 9/2005 | Sheng et al. | |
| 2006/0129881 A1 | 6/2006 | Furuichi et al. | |
| 2008/0175068 A1 | 7/2008 | Houston et al. | |
| 2012/0110352 A1* | 5/2012 | Branover | G06F 1/206 713/300 |

FOREIGN PATENT DOCUMENTS

| | | |
|---|---|---|
| JP | 2002189602 A | 7/2002 |
| JP | 2003058271 A | 2/2003 |
| JP | 2006146605 A | 6/2006 |
| JP | 2007206909 A | 8/2007 |
| KR | 1020060002574 A | 1/2006 |
| KR | 10-0608709 A | 8/2006 |
| KR | 1020060118715 A | 11/2006 |
| KR | 1020080056457 A | 6/2008 |
| KR | 10-1145992 | 5/2012 |
| KR | 10-1149644 | 5/2012 |

* cited by examiner

| DVFS Mode | | | RBB Level |
|---|---|---|---|
| Mode | Voltage(VDD) | Frequency(f) | |
| 1st | 2.0V | 3.0GHz | High |
| 2nd | 1.5V | 2.0GHz | Middle |
| 3rd | 1.3V | 1.5GHz | Off |
| ... | ... | ... | ... |

SYSTEM ON CHIP AND TEMPERATURE CONTROL METHOD THEREOF

CROSS-REFERENCE TO RELATED APPLICATIONS

This application claims priority from Korean Patent Application No. 10-2012-0081855 filed Jul. 26, 2012, the entirety of which is incorporated by reference herein.

BACKGROUND

Methods and apparatuses consistent with exemplary embodiments relate to a semiconductor device, and more particularly, relate to a semiconductor device capable of controlling the amount of idle current according to a temperature and a temperature controlling method thereof.

In recent years, the use of mobile devices such as a smart phone, a tablet personal computer (PC), a digital camera, an MP3 player, a personal digital assistant (PDA), and the like has rapidly increased. Such mobile devices may necessitate a high-speed processor due to multimedia processing and an increase in throughput of various types of data. The mobile devices may include semiconductor devices such as a working memory (e.g., a DRAM), a nonvolatile memory, and an application processor (AP) to drive various application programs. The degree of integration and driving frequencies of the semiconductor devices is expected to increase according to a demand for high performance at a mobile environment.

In a mobile device, managing of a temperature of a semiconductor device may be very important to improve an overall performance and to reduce power consumption of the mobile device. A temperature of a semiconductor device may be managed by measuring a temperature precisely and controlling the temperature rapidly and appropriately according to the measured result. In particular, an idle current of a semiconductor device may increase as a refinement process for high integration is developed. The amount of idle current of the semiconductor device may be highly susceptible to a temperature. A phenomenon (e.g., Thermal Runaway) causing a mutual rising action between an increase in a temperature and an increase in an idle current may significantly degrade the performance of the semiconductor device.

In high-performance semiconductor devices, an unintended rapid increase in a temperature may greatly affect the performance and reliability of the semiconductor devices. As the market for mobile devices expands, managing of temperatures of semiconductor devices included in mobile devices becomes important. Thus, a technique is required for efficiently controlling temperatures of semiconductor devices included in a mobile device or another electronic device.

SUMMARY

According to an aspect of an embodiment, there is provided a temperature control method of a semiconductor device, the temperature control including: detecting a temperature of the semiconductor device; activating a reverse body biasing operation in which a body bias voltage applied to a function block of the semiconductor device is regulated, when the detected temperature is greater than a first temperature level; and activating a thermal throttling operation in which at least one of a frequency of a driving clock provided to a function block of the semiconductor device and a driving voltage applied to the function block of the semiconductor device is regulated, when the detected temperature is greater than a second temperature level that is different than the first temperature level.

The reverse body biasing operation and the thermal throttling operation may be performed simultaneously when the detected temperature is greater than both of the first temperature level and the second temperature level.

The second temperature level may be greater than the first temperature level.

The first temperature level may be greater than the second temperature level.

The activating the thermal throttling operation may include performing the thermal throttling operation in one of a plurality of modes and each of the plurality of modes specifies a different level of the frequency of the driving clock and a different level of the driving voltage, respectively.

The body bias voltage may be changed to different levels in response to the plurality of modes, respectively.

The function block may include a plurality of sub blocks according operating properties and a level of a body bias voltage provided to at least one of the plurality of sub blocks is different from a level of a body bias voltage applied to the remaining sub blocks.

According to an aspect of another embodiment, there is provided temperature control method of a semiconductor device, the temperature control method including: setting a thermal throttling mode to one of a plurality of different thermal throttling modes; performing a thermal throttling operation and a reverse body biasing operation according to the set thermal throttling mode, wherein in the thermal throttling operation, at least one of a driving voltage and a frequency of a driving clock provided to a function block of the semiconductor device is changed according to the set thermal throttling mode, and in the reverse body biasing operation, a body bias voltage applied to the function block of the semiconductor device is set according to the set thermal throttling mode; and detecting a temperature of the semiconductor device; and adjusting a level of the set body bias voltage applied to the function block of the semiconductor based on the detected temperature.

The setting the thermal throttling mode may include setting the thermal throttling mode based on at least one of a driving performance of the semiconductor device and a power dissipation of the semiconductor device.

The plurality of thermal throttling modes may include at least a first mode, a second mode and a third mode, and each of the first mode, the second mode and the third mode specifies a different level of the frequency of the driving clock and a different level of the driving voltage.

In the performing the reverse body biasing operation, the body bias voltage may be set to different levels in accordance with the plurality of modes, respectively.

The performing the reverse body biasing operation may include: setting the level of the body bias voltage to a first level when the thermal throttling mode is set to the first mode; setting the level of the body bias voltage to a second level when the thermal throttling mode is set the second mode; and setting the level of the body bias voltage to a third level when the thermal throttling mode is set to the third mode, wherein the first level is greater than the second level, and the second level is greater than the third level.

The function block may include a plurality of sub blocks according to operating properties and a level of a body bias voltage provided to at least one of the plurality of sub blocks is different from a level of a body bias voltage applied to the remaining sub blocks.

According to an aspect of another embodiment, there is provided a system on chip including: a plurality of transistors; a body bias generator which provides a body bias voltage to the plurality of transistors; and a control unit configured to control the body bias generator to activate a reverse body biasing operation in which the body bias voltage provided by the body bias generator is regulated when a temperature of the system on chip is greater than a first temperature level, and configured to activate a thermal throttling operation in which at least one of a frequency of a driving clock applied to the plurality of transistors and a driving voltage applied to the plurality of transistors is regulated when the temperature of the system on chip is greater than a second temperature level that is different than the first temperature level.

The reverse body biasing operation and the thermal throttling operation may be performed simultaneously when the detected temperature is greater than both of the first temperature level and the second temperature level.

The second temperature level may be greater than the first temperature level.

The first temperature level may be greater than the second temperature level.

The control unit may perform the thermal throttling operation in one of a plurality of modes, and each of the plurality of modes specify a different level of the frequency of the driving clock and a different level of the driving voltage.

The control unit may control the body bias generator to change the body bias voltage to different levels in response to the plurality of modes, respectively.

The system on chip may further include a temperature sensor which measures the temperature of the system on chip and provides the measured temperature to the control unit.

The system on chip may further include a performance monitor which measures a performance of the system on chip and provides the measured performance to the control unit, and the control unit may be further configured to adjust a level of reverse body biasing operation in accordance with the measured performance.

According to an aspect of another embodiment, there is provided a system on chip including: a plurality of transistors; a body bias generator which provides a body bias voltage to the plurality of transistors; and a control unit configured to set a thermal throttling mode to one of a plurality of different thermal throttling modes, configured to activate a thermal throttling operation and a reverse body biasing operation according to the set thermal throttling mode, wherein in the thermal throttling operation, at least one of a driving voltage and a frequency of a driving clock provided to the plurality of transistors is changed according to the set thermal throttling mode, and in the reverse body biasing operation, the body bias voltage applied to the plurality of transistors is set according to the set thermal throttling mode, and configured to control the body bias generator to adjust a level of the set bias voltage applied to the plurality of transistors based on a temperature of the system on chip.

The control unit may set the thermal throttling mode based on at least one of a driving performance of the system on chip and a power dissipation of the system on chip.

The plurality of thermal throttling modes may include at least a first mode, a second mode and a third mode, and each of the first mode, the second mode and the third mode specifies a different level of the frequency of the driving clock and a different level of the driving voltage.

The body bias voltage may be set to different levels in accordance with the plurality of modes, respectively.

The control unit may control the body bias generator to set the level of the body bias voltage to a first level when the thermal throttling mode is set to the first mode, controls the body bias generator to set the level of the body bias voltage to a second level when the thermal throttling mode is set the second mode, and controls the body bias generator to set the level of the body bias voltage to a third level when the thermal throttling mode is set to the third mode, wherein the first level may be greater than the second level, and the second level is greater than the third level.

The system on chip may further include a temperature sensor which measures the temperature of the system on chip and provides the measured temperature to the control unit.

The system on chip may further include a performance monitor which measures a performance of the system on chip and provides the measured performance to the control unit, wherein the measured performance comprises at least one of the driving performance of the system on chip and the power dissipation of the system on chip.

According to an aspect of another embodiment, there is provided a computer-readable recording medium storing a computer-readable program that when executed by a computer performs the temperature control method.

According to an aspect of another embodiment, there is provided a system on chip including: a temperature sensor which measures the temperature of the system on chip; a plurality of transistors; a clock generator which provides a driving clock to the plurality of transistors; a power manager which provides a driving voltage to the plurality of transistors; a body bias generator which provides a body bias voltage to the plurality of transistors; and a control unit which is configured to control the body bias generator to activate a reverse body biasing operation in which the body bias voltage provided by the body bias generator is regulated when the measured temperature of the system on chip is greater than a first temperature level, and is configured to control the clock generator and the power manager to activate a thermal throttling operation in which at least one of a frequency of the driving clock provided to the plurality of transistors and the driving voltage provided to the plurality of transistors is regulated when the measured temperature of the system on chip is greater than a second temperature level that is different than the first temperature level, wherein the reverse body biasing operation and the thermal throttling operation are performed simultaneously when the measured temperature is greater than both of the first temperature level and the second temperature level.

According to an aspect of another embodiment, there is provided a temperature control method of a semiconductor device, the temperature control method including: activating a thermal throttling operation in which at least one of a frequency of a driving clock provided to a function block of the semiconductor device and a driving voltage applied to the function block of the semiconductor device is regulated; detecting a level of power dissipation of the semiconductor device; and activating a reverse body biasing operation in which a body bias voltage applied to a function block of the semiconductor device is regulated according to the detected level of power dissipation.

The activating the reverse body biasing operation may include: setting the body bias voltage to a first level when the level of power dissipation is a greater than a first reference level; and setting the body bias voltage to a second level when the level of power dissipation is greater than a second reference level; wherein the first level of the body bias voltage is greater than the second level of the body bias voltage, and wherein the first reference level is greater than the second reference level.

The temperature control method may further include deactivating the reverse body biasing operation when the level of power dissipation is less than a third reference level, and the third reference level is less than the second reference level.

The activating the thermal throttling operation may include performing the thermal throttling operation in one of a plurality of modes and each of the plurality of modes specifies a different level of the frequency of the driving clock and a different level of the driving voltage, respectively.

The function block may include a plurality of sub blocks according operating properties and a level of a body bias voltage provided to at least one of the plurality of sub blocks is different from a level of a body bias voltage applied to the remaining sub blocks.

According to an aspect of another embodiment, there is provided a system on chip including: a plurality of transistors; a body bias generator which provides a body bias voltage to the plurality of transistors; a performance monitor which measures a power dissipation of the system on chip and provides the measured performance to the control unit; and a control unit configured to activate a thermal throttling operation in which at least one of a frequency of a driving clock and a driving voltage applied to the plurality of transistors is regulated, and activate a reverse body biasing operation in which the body bias voltage applied to the plurality of transistors by the body bias generator is regulated according to the detected level of power dissipation.

The control unit may control the body bias generator to set the body bias voltage to a first level when the level of power dissipation is a greater than a first reference level, and controls the body bias generator to set the body bias voltage to a second level when the level of power dissipation is greater than a second reference level; wherein the first level of the body bias voltage is greater than the second level of the body bias voltage, and wherein the first reference level is greater than the second reference level.

The control unit may be further configured to deactivate the reverse body biasing operation when the level of power dissipation is less than a third reference level, and the third reference level is less than the second reference level.

The control unit may activate the thermal throttling operation in one of a plurality of modes and each of the plurality of modes specifies a different level of the frequency of the driving clock and a different level of the driving voltage, respectively.

BRIEF DESCRIPTION OF THE FIGURES

The above and/or other aspects will become apparent from the following description of embodiments with reference to the following figures, wherein like reference numerals refer to like parts throughout the various figures unless otherwise specified, and wherein.

DETAILED DESCRIPTION

Figure 1:
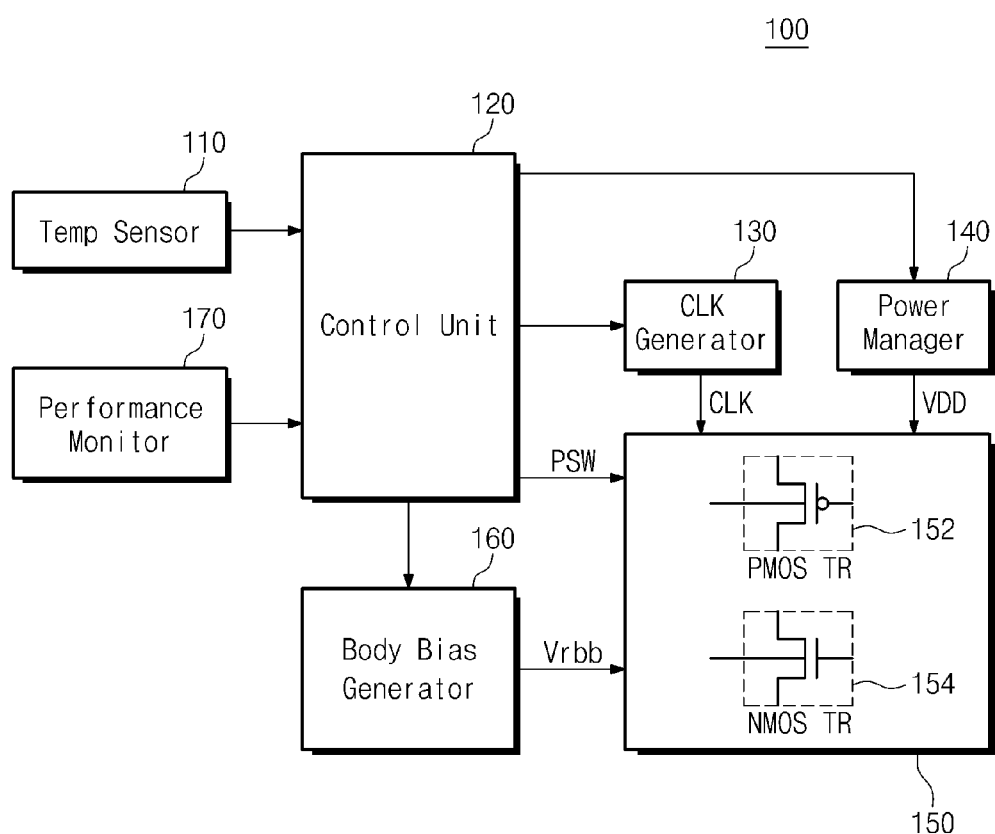
FIG. 1 is a block diagram schematically illustrating a semiconductor device according to an embodiment.

Embodiments will be described in detail with reference to the accompanying drawings. The inventive concepts, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the embodiments.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram schematically illustrating a semiconductor device according to an embodiment. Referring to FIG. 1, a semiconductor device 100 may include a control unit 120 and a body bias generator 160. The semiconductor device 100 may control a driving temperature efficiently over minimizing lowering of the performance through the control unit 120 and the body bias generator 160. Herein, the semiconductor device 100 may include a System On Chip (or, System on a chip) (hereinafter, referred to as SoC) having a plurality of Intellectual Properties (hereinafter, referred to as IPs).

A temperature sensor 110 may sense an internal temperature of the semiconductor device 100. For example, the temperature sensor 110 may be a thermal electromotive force (or, a thermocouple) sensor using an electromotive force (EMF) varying according to a temperature, a thermal conductivity sensor sensing a resistance value varying according to a temperature, or the like. However, the inventive concept is not limited thereto. The temperature sensor 110 may provide the sensed temperature to the control unit 120.

The control unit 120 may control various components of the semiconductor device 100, The control unit 120 may control a level of driving voltage VDD or a frequency of a driving clock CLK based on the internal temperature of the semiconductor device 100. For example, when the internal temperature of the semiconductor device 100 is greater than a reference temperature, the control unit 120 may control a power manager 140 such that a level of the driving voltage VDD is lowered. Also, when the internal temperature of the semiconductor device 100 is greater than a reference temperature, the control unit 120 may control a clock generator 130 (e.g., a Phase Locked Loop (PLL)) such that a frequency of the driving clock CLK is lowered. The control unit 120 may provide a switching signal PSW for blocking the driving voltage VDD to be supplied to a function block 150 based on the internal temperature of the semiconductor device 100. A technique for controlling the driving voltage VDD and/or the driving clock CLK to be provided to the function block 150 under the control of the control unit 120 when the internal temperature of the semiconductor device 100 increases may be referred to as thermal throttling.

The control unit 120 may adjust a level of an idle current by controlling a body bias together with the thermal throttling. For example, the control unit 120 may change a body bias condition in view of at least one of the internal temperature of the semiconductor device 100, a level of the thermal throttling operation, power consumption of the semiconductor device 100, a current performance of the semiconductor device 100, and process variations. The control unit 120 may control the body bias generator 160 to change a body bias of the function block 150.

The clock generator 130 may generate a clock signal CLK for driving of the semiconductor device 100. The clock signal CLK may be provided to the function block 150 to drive an overall computational operation of the function block 150. The clock generator 130 may include a phase locked loop. However, the inventive concept is not limited thereto. The clock generator 130 may vary a frequency f of the driving clock CLK generated under the control of the control unit 120.

The power manager 140 may transfer an externally provided power supply voltage to the function block 150 under the control of the control unit 120. The power manager 140 may adjust a level of an external voltage provided from the outside of the semiconductor device 100 to provide the adjusted voltage as the driving voltage VDD of the function block 150. The power manager 140 may be configured to step up or down the external voltage. If the external voltage is lower than a voltage level VDD (e.g., about 2.0V) that the semiconductor device 100 requires, the power manager 140 may boost the external voltage to supply the boosted external voltage to the function block 150. If the external voltage is higher than a voltage level that the semiconductor device 100 requires, the power manager 140 may reduce the external voltage to supply the reduced external voltage to the function block 150.

The function block 150 may be a set of circuits performing various operations according to input data or control signals. The function block 150 may include various circuits performing an overall function of the semiconductor device 100. The smallest logic unit of the function block 150 may be a transistor. The transistor included in the function block 150 may be a PMOS transistor 152 or an NMOS transistor 154, for example. Properties of the PMOS and NMOS transistors 152 and 154 may become a critical parameter for determining a property of the semiconductor device 100. For example, the performance of the function block 150 or the semiconductor device 100 may be decided according to driving speeds of the PMOS and NMOS transistors 152 and 154.

Upon executing of the thermal throttling, the driving voltage VDD provided to the PMOS and NMOS transistors 152 and 154 (e.g., source or drain) of the function block 150 may be adjusted. Also, upon executing of the thermal throttling, a frequency of a gate control signal for driving the PMOS and NMOS transistors 152 and 154 may be adjusted. In addition, a body bias voltage Vrbb provided to bodies of the PMOS and NMOS transistors 152 and 154 of the function block 150 may be adjusted. If the body bias voltage Vrbb provided between a source/drain and a body in a reverse direction increases, idle currents of the PMOS and NMOS transistors 152 and 154 may decrease. Thus, a temperature increasing factor due to an idle current may be solved in part by increasing a body bias.

The body bias generator 160 may provide the body bias voltage Vrbb for the PMOS and NMOS transistors 152 and 154 of the function block 150. The body bias generator 160 may increase or decrease a body voltage of the PMOS or NMOS transistor 152 or 154 under the control of the control unit 120.

A performance monitor 170 may monitor a driving performance of the semiconductor device 100 or the function block 150. The performance monitor 170 may monitor the amount of power dissipation of the semiconductor device 100 or the function block 150. The performance of components of the semiconductor device 100 or power dissipation due to an idle current may vary according to a variation in a temperature. The performance monitor 170 may monitor the course of variation in the power dissipation or performance, and the monitored result may be provided to the control unit 120, for example, as a quantized value.

Various components constituting the semiconductor device 100 may be described above. However, some components constituting the semiconductor device 100 can be replaced with components provided outside the semiconductor device. That is, the power manager 140 may be provided as a separate power element provided outside the semiconductor device 100. The temperature sensor 110 or the body bias generator 160 can be replaced with elements provided outside the semiconductor device 100. The body bias generator 160 may be provided with a component such as a voltage regulator for supplying an internal voltage of the semiconductor device 100, and may be formed of the same chip as the power manager 140.

The semiconductor device 100 may perform thermal throttling and body bias regulating at the same time. For the thermal throttling, the control unit 120 may vary the driving voltage VDD and/or a frequency of the driving clock CLK. In addition, in a case where it is difficult to control a temperature of the semiconductor device 100 or to compensate lowering of the performance thereof only by the thermal throttling, the control unit 120 may reduce an idle current by increasing a body voltage of transistors of the semiconductor device 100. Thus, an increase in temperature due to an idle current may be blocked by reduction of an idle current.

Figure 2:
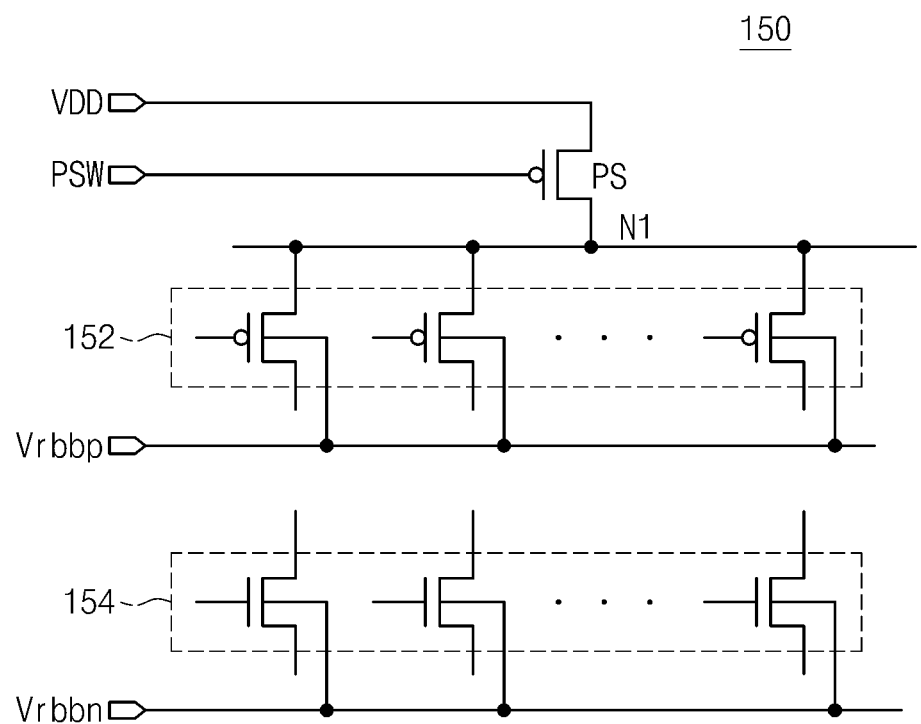
FIG. 2 is a circuit diagram schematically illustrating a function block in FIG. 1.

FIG. 2 is a circuit diagram schematically illustrating a function block in FIG. 1. Referring to FIG. 2, a function block 150 may include a plurality of PMOS transistors 152, a plurality of NMOS transistors 154, and a power switch PS. Although not shown in FIG. 2, the function block 150 may further include various components besides transistors.

The power switch PS may switch a driving voltage VDD provided to the function block 150. The power switch PS may transfer the driving voltage VDD from a power manager to a node N1 in response to a switching signal PSW from a control unit 120. The node N1 may be connected with sources of the PMOS transistors 152. In FIG. 2, there may be illustrated an example that the power switch PS is formed of a PMOS transistor. However, the inventive concept is not limited thereto. The power switch PS can be formed of an NMOS transistor or a high voltage transistor.

The PMOS transistors 152 may include whole PMOS transistors included in the function block 150. Sources of some PMOS transistors of the PMOS transistors 152 may be connected with the node N1. Sources of the other PMOS transistors thereof may be connected with drains or sources of PMOS transistors or NMOS transistors included in the function block 150. Drains of the PMOS transistors may be grounded or connected with drains or sources of PMOS transistors or NMOS transistors included in the function block 150. Bodies of the PMOS transistors 152 may be provided with a PMOS body bias voltage Vrppp supplied from a body bias generator 160.

The NMOS transistors 154 may include whole NMOS transistors included in the function block 150. Sources of the other NMOS transistors of the NMOS transistors 154 may be connected with drains or sources of PMOS transistors or NMOS transistors included in the function block 150. Sources of the NMOS transistors 154 may be grounded or connected with drains or sources of PMOS transistors or NMOS transistors included in the function block 150. Bodies of the NMOS transistors 154 may be provided with an NMOS body bias voltage Vrppn supplied from the body bias generator 160.

Figure 3A:
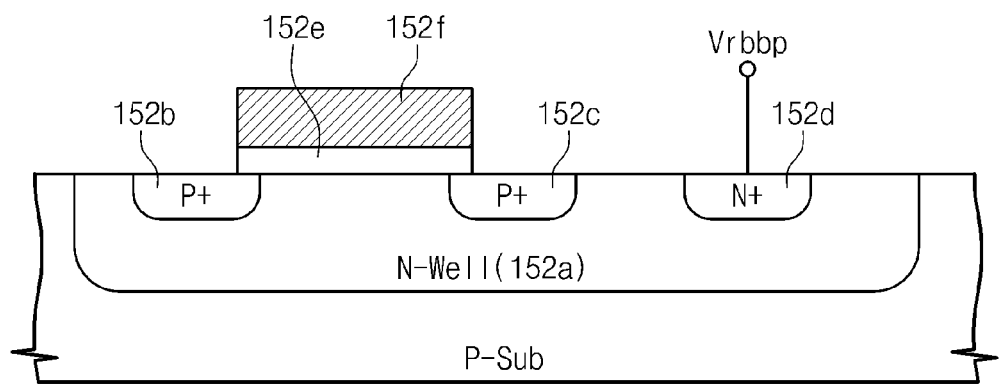
FIG. 3A is a cross-sectional view of a PMOS transistor in FIG. 2.
Figure 3B:
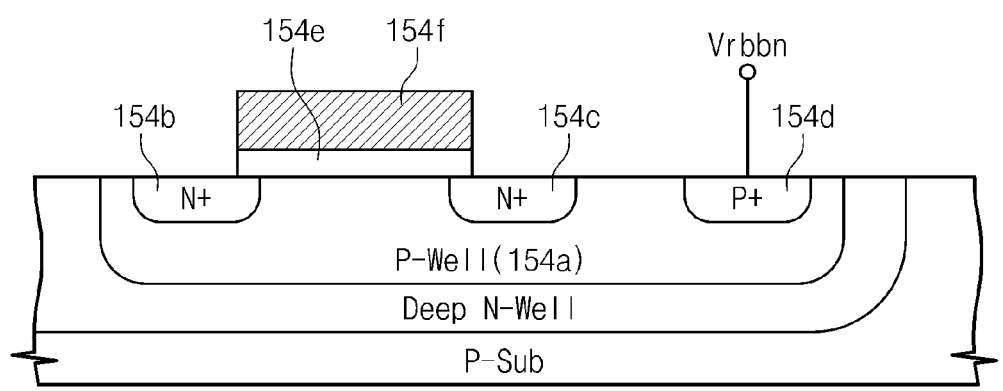
FIG. 3B is a cross-sectional view of an NMOS transistor in FIG. 2.

FIG. 3A is a cross-sectional view of a PMOS transistor in FIG. 2, and FIG. 3B is a cross-sectional view of an NMOS transistor in FIG. 2.

Referring to FIG. 3A, to form a PMOS transistor 152, an N-well 152*a* may be formed at a substrate P-Sub. The N-well 152*a* may be formed by injecting N-type dopants into the substrate P-Sub. Then, P+ doping regions 152*b* and 152*c* for drain and source of a PMOS transistor may be formed at the N-well 152*a*. An N+ doping region 152*d* for providing a body bias voltage Vrbbp may be formed at the N-well 152*a*. Afterwards, a gate insulation film 152*e* and a gate electrode 152*f* may be stacked sequentially. The gate insulation film 152*e* may be formed of an oxide film, a nitride film, or a film formed by stacking the oxide film and the nitride film. Further, the gate insulation film 152*e* may be formed of a metal oxide material having high permittivity, a film formed by stacking them as a laminate structure, or a film formed by mixing them. The gate electrode 152f may be formed of a polysilicon film doped with impurity ions (e.g., P, As, B, etc.) or a metal film.

If the body bias voltage Vrbbp increases, a reverse bias between the P+ doping regions 152b and 152c and the N-well 152a may increase. In this case, an idle current may decrease which flows between the source and the drain of the PMOS transistor 152 formed of the P+ doping regions 152b and 152c.

Referring to FIG. 3B, to form an NMOS transistor 154, a deep N-well may be formed at a substrate P-Sub, and a P-well 154a may be formed at the deep N-well. N+ doping regions 154b and 154c for drain and source may be formed at the P-well 154a. Also, a P+ doping region 154d for providing a body bias voltage Vrbbn may be formed at the P-well 154a. Then, a gate insulation film 154e and a gate electrode 154f may be stacked sequentially. If a level of the body bias voltage Vrbbn provided as a negative voltage increases a reverse bias between the N+ doping regions 154b and 154c and the substrate P-Sub may increase. In this case, an idle current may decrease which flows between the source and the drain of the NMOS transistor 154 formed of the N+ doping regions 154b and 154c.

Figure 4A:
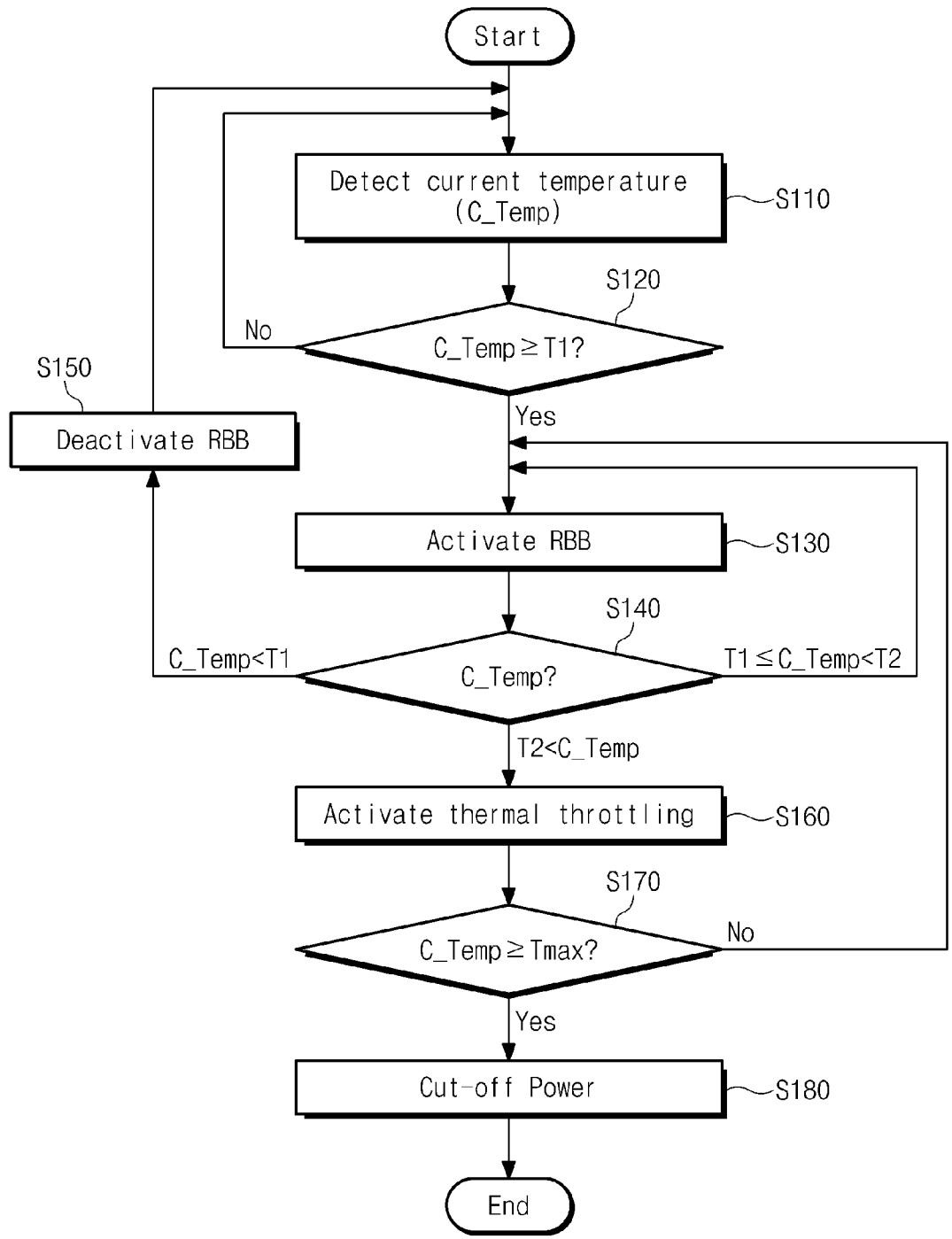
FIGS. 4A and 4B are flowcharts illustrating temperature controlling methods of a semiconductor device according to embodiments.
Figure 4B:
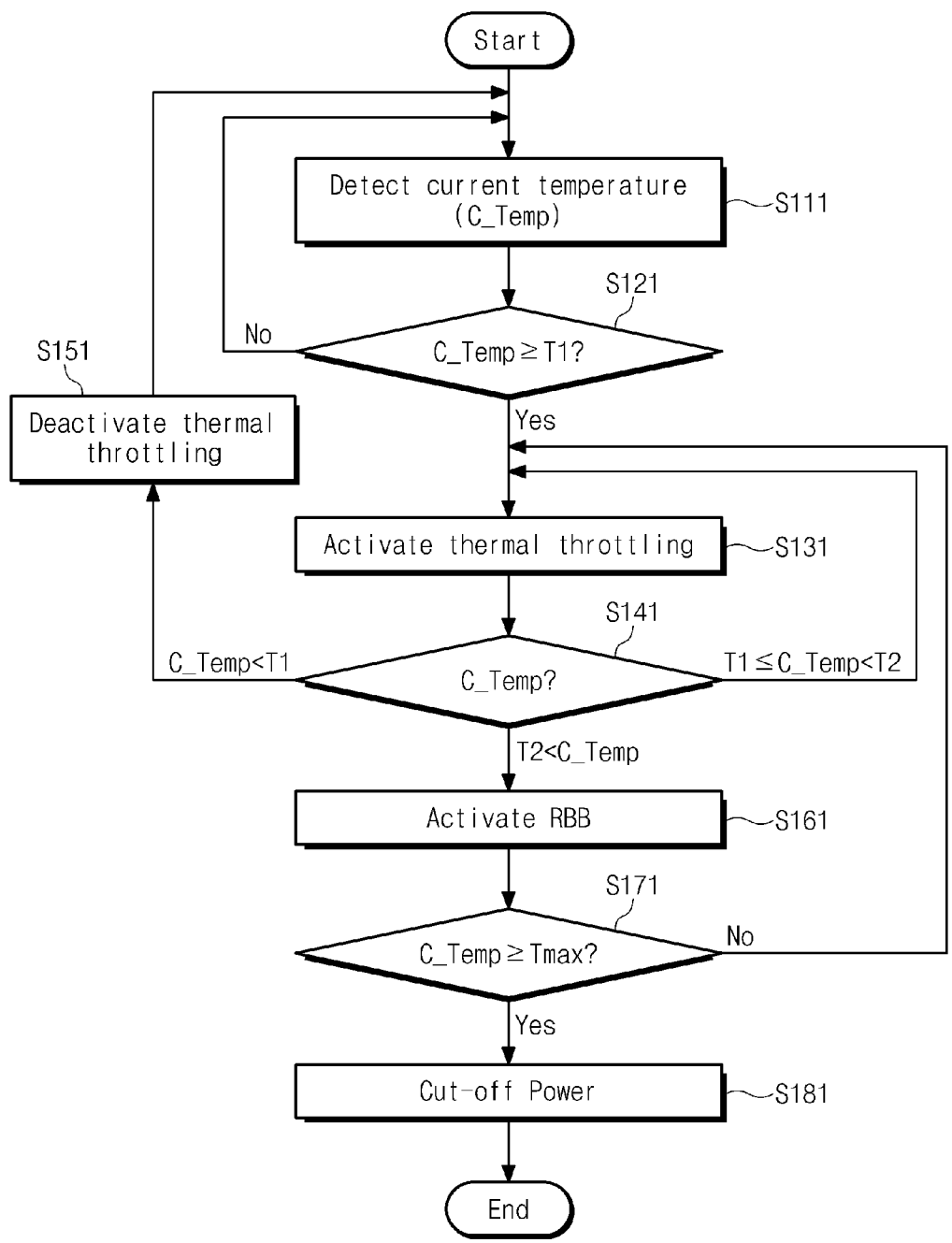

FIGS. 4A and 4B are flowcharts is a flowchart illustrating temperature controlling methods of a semiconductor device according to embodiments.

Referring to FIG. 4A, a control unit 120 may control a body bias and/or perform thermal throttling, based on a current temperature of a semiconductor device 100.

In operation S110, the control unit 120 may detect an internal temperature C_Temp of the semiconductor device 100. The control unit 120 may detect the internal temperature C_Temp based on real-time temperature data provided from a temperature sensor 110.

In operation S120, the control unit 120 may determine whether the internal temperature C_Temp is greater than a first reference temperature T1. If the internal temperature C_Temp is below the first reference temperature T1, the method proceeds to operation S110. That is, in case that the internal temperature C_Temp is below the first reference temperature T1, thermal throttling or regulating of a body bias may not be performed. If the internal temperature C_Temp greater than the first reference temperature T1, the method proceeds to operation S130.

In operation S130, the control unit 120 may activate a body bias regulating operation. For example, the control unit 120 may control a body bias generator 160 to increase levels of body bias voltages Vrbbp and Vrbbn provided to transistors 152 and 154 of a function block 150. If the body bias regulating operation is activated, a body voltage (e.g., a positive voltage) of the PMOS transistor 152 may increase, and a body voltage (e.g., a negative voltage) of the NMOS transistor 154 may decrease (increase in light of an absolute value).

In operation S140, the control unit 120 may detect the internal temperature C_Temp and determine a variation in the internal temperature C_Temp under the condition that the body bias regulating operation is activated. The control unit 120 may determine which temperature range that the internal temperature C_Temp from the temperature sensor 110 falls within. If the internal temperature C_Temp is less than the first reference temperature T1 (e.g., in the case that the body bias regulating operation lowered the internal temperature C_Temp to a temperature below the first reference temperature T1), the method proceeds to operation S150. If the internal temperature C_Temp is greater than the first reference temperature T1 and less than a second reference temperature T2 (e.g., in the case that the body bias regulating operation does not sufficiently lowered the internal temperature C_Temp to a temperature below the first reference temperature T1), the method proceeds to operation S130. If the internal temperature C_Temp is greater than the second reference temperature T2, the method proceeds to operation S160.

In operation S150, since the internal temperature C_Temp is less than the first reference temperature T1, the control unit 120 may inactivate the body bias regulating operation. The control unit 120 may control the body bias generator 160 such that the body voltage Vrbb provided to the function block 150 is reset to a default value.

In operation S160, the control unit 120 may activate the thermal throttling operation. To execute the thermal throttling operation, the control unit 120 may control a power manager 140 to lower a level of a driving voltage VDD. This may be performed to suppress an increase in temperature by reducing power dissipation. Also, to activate the thermal throttling operation, the control unit 120 may control a clock generator 130 to lower a frequency of a driving clock CLK. The control unit 120 may control the clock generator 130 and the power manager 140 such that a level of the driving voltage VDD and a frequency of the driving clock CLK are simultaneously controlled for thermal throttling.

In operation S170, the control unit 120 may detect the internal temperature C_Temp and determine a variation in temperature under the condition that the body bias regulating operation and the thermal throttling operation are activated. The control unit 120 may determine whether the internal temperature C_Temp provided from the temperature sensor 110 belongs to any temperature range. In case that the internal temperature C_Temp is lower an upper limit temperature Tmax, the method proceeds to operation S130. If the internal temperature C_Temp exceeds the upper limit temperature Tmax, the method proceeds to operation S180.

In operation S180, the control unit 120 may supply a switching signal PSW to block the driving voltage VDD provided to the function block 150. A circuit may be prevented from being damaged due to a high temperature by blocking the driving voltage VDD. It is well understood that an operation of backing up data states, operating states, and the like of the function block is performed prior to blocking of the driving voltage VDD.

Referring to FIG. 4B, the control unit 120 may control a body bias and/or perform thermal throttling, based on a current temperature of a semiconductor device 100. The temperature control method of FIG. 4B differs from the temperature control method of FIG. 4A in that thermal throttling is activated if the internal temperature C_Temp is greater than the first reference temperature T1 and body biasing is activated if the internal temperature C_Temp is greater than the second reference temperature T2. Accordingly, operations 111, 121, 141, 171, and 181 in FIG. 4B are similar to corresponding operations 110, 120, 140, 170, and 180 in FIG. 4A, and therefore repeated descriptions of thereof are omitted.

If the internal temperature C_Temp is greater than the first reference temperature T1, the method proceeds to operation S131. In operation S131, the control unit 120 may activate the thermal throttling operation. To execute the thermal throttling operation, the control unit 120 may control the power manager 140 to lower a level of a driving voltage VDD. This may be performed to suppress an increase in temperature by reducing power dissipation. Also, to activate the thermal throttling operation, the control unit 120 may control a clock generator 130 to lower a frequency of a driving clock CLK. The control unit 120 may control the clock generator 130 and the power manager 140 such that a level of the driving voltage VDD and a frequency of the driving clock CLK are simultaneously controlled for thermal throttling.

If is determined that the internal temperature C_Temp falls below the first reference temperature T1, the control unit 120 may deactivate the thermal throttling operation in operation S151.

If it is determined that the internal temperature C_Temp is greater than the second reference temperature T2, the method proceeds to operation S161 in which the control unit 120 may activate a body bias regulating operation. For example, the control unit 120 may control a body bias generator 160 to increase levels of body bias voltages Vrbbp and Vrbbn provided to transistors 152 and 154 of a function block 150. If the body bias regulating operation is activated, a body voltage (e.g., a positive voltage) of the PMOS transistor 152 may increase, and a body voltage (e.g., a negative voltage) of the NMOS transistor 154 may decrease (increase in light of an absolute value).

With the above-described temperature control method, the semiconductor device 100 may have a temperature controlling capacity. In addition, it is possible to block a thermal feedback phenomenon such as temperature increase of an idle current caused when only the thermal throttling operation is performed. Thus, lowering of the performance of the semiconductor device 100 due to the thermal throttling may be reduced through the above-described temperature control method.

Figures 5, 6:
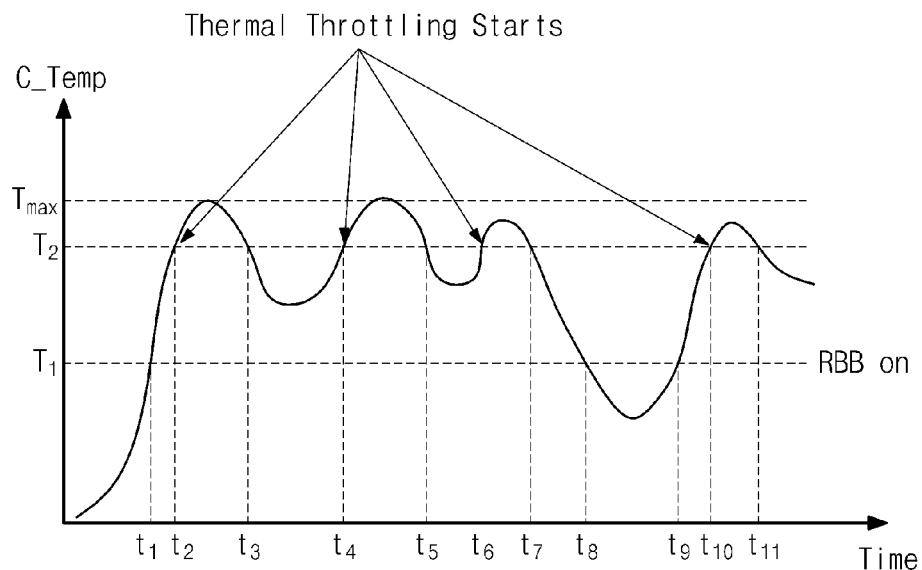
FIG. 5 is a graph illustrating a temperature variation of a semiconductor device using a temperature control method.
FIG. 6 is a table illustrating a temperature control method according to another embodiment.

FIG. 5 is a graph illustrating a temperature variation of a semiconductor device using a temperature control method. Referring to FIG. 5, a temperature of a semiconductor device may be efficiently managed by both a body bias regulating operation and a thermal throttling operation.

At time t1 when an internal temperature C_Temp is greater than a first reference temperature T1, a body bias regulating (RBB) operation may be activated. That is, an absolute value of a body voltage provided to a body of a function block 150 may increase. This may make channels of PMOS and NMOS transistors 152 and 154 be shortened. Thus, as the body bias regulating operation is activated, the amount of idle current of the function block 150 may be sharply reduced.

Although the body bias regulating operation is activated, the internal temperature C_Temp can exceed a second reference temperature T2 at time t2. In this case, a thermal throttling operation may be activated. When the thermal throttling operation is activated, the internal temperature C_Temp may be lowered below the second reference temperature T2 without exceeding an upper limit temperature Tmax.

With the above description, if the internal temperature C_Temp is greater than the first reference temperature T1, the body bias regulating operation may be activated. This case may be generated at times t1 and t9, respectively. If the internal temperature C_Temp is greater than the second reference temperature T2, the thermal throttling operation may be further activated. Thus, when the internal temperature C_Temp is greater than the second reference temperature T2, both the body bias regulating operation and the thermal throttling operation may be activated. This case may be generated at times t2, t4, t6, and t10, respectively.

If the internal temperature C_Temp is lowered below the second reference temperature T2, the thermal throttling operation may be inactivated and the body bias regulating operation may be activated. This case may be generated at times t3, t5, t7, and t11, respectively.

With the above-described temperature control method, it is possible to manage a temperature of a semiconductor device 100 efficiently and to prevent an unintended sharp temperature increase and lowering of the performance. In FIGS. 4 and 5, there may be described the case that a temperature T1 where the body bias regulating operation is activated is less than a temperature T2 where the thermal throttling operation is activated. However, the inventive concept is not limited thereto. For example, a temperature T1 where the body bias regulating operation may be equal to a temperature T2 where the thermal throttling operation is activated. Alternatively, a temperature T1 where the body bias regulating operation can be set to be greater than a temperature T2 where the thermal throttling operation is activated.

FIG. 6 is a table illustrating a temperature control method according to another embodiment. Referring to FIG. 6, one of plural body bias regulating (RBB) levels may be selectively activated according to a plurality of thermal throttling modes.

A plurality of voltage-frequency modes scaling a level of a voltage and/or frequency may be used as a thermal throttling manner. A manner of realizing the plurality of voltage-frequency modes may be referred to as Dynamic Voltage Frequency Scale (DVFS). The DVFS mode may include, for example, first to third DVFS modes for thermal throttling. The first DVFS mode may be a mode in which a driving voltage VDD is set to about 2.0V and a driving clock CLK is set to a frequency of about 3.0 GHz. The second DVFS mode may be a mode in which the driving voltage VDD is set to about 1.5V and the driving clock CLK is set to a frequency of about 2.0 GHz. The third DVFS mode may be a mode in which the driving voltage VDD is set to about 1.3V and the driving clock CLK is set to a frequency of about 1.5 GHz. The DVFS mode may further comprise modes in which a level of the driving voltage VDD or a frequency of the driving clock CLK is set to be different (for example, lower) than that of the first to third modes. Each DVFS mode may be changed according to a required circuit performance or a temperature control manner.

A body bias regulating level may be selectively used according to the above-described DVFS mode. For example, a body bias regulating operation may be activated at the first and second DVFS modes where an increase in temperature and lowering of the performance due to thermal feedback becomes a serious problem. High-level body bias regulating may be selected and activated at the first DVFS mode in which the driving voltage VDD and a frequency of the driving clock CLK is highest. On the other hand, middle-level body bias regulating may be selected and activated at the second DVFS mode in which the driving voltage VDD and a frequency of the driving clock CLK is lower compared with the first DVFS mode and higher compared with the third DVFS mode. The body bias regulating operation may be inactivated in remaining DVFS modes.

In the event that different body bias levels are used according to the above-described DVFS mode, lowering of the performance due to activation of a body bias regulating operation may be minimized. If the body bias regulating operation is activated, an idle current of a transistor may be reduced. In this case, while a temperature increase is suppressed, a threshold voltage may inevitably increase. Thus, at a voltage-frequency mode where a body bias regulating operation is activated, a driving voltage and a frequency of a driving clock may be determined to be high enough to compensate speed lowering.

A semiconductor device 100 may maintain an optimized performance over suppressing an increase in an internal temperature by performing a selective body bias regulating operation with respect to various DVFS modes of voltage-frequency setting.

Figure 7A:
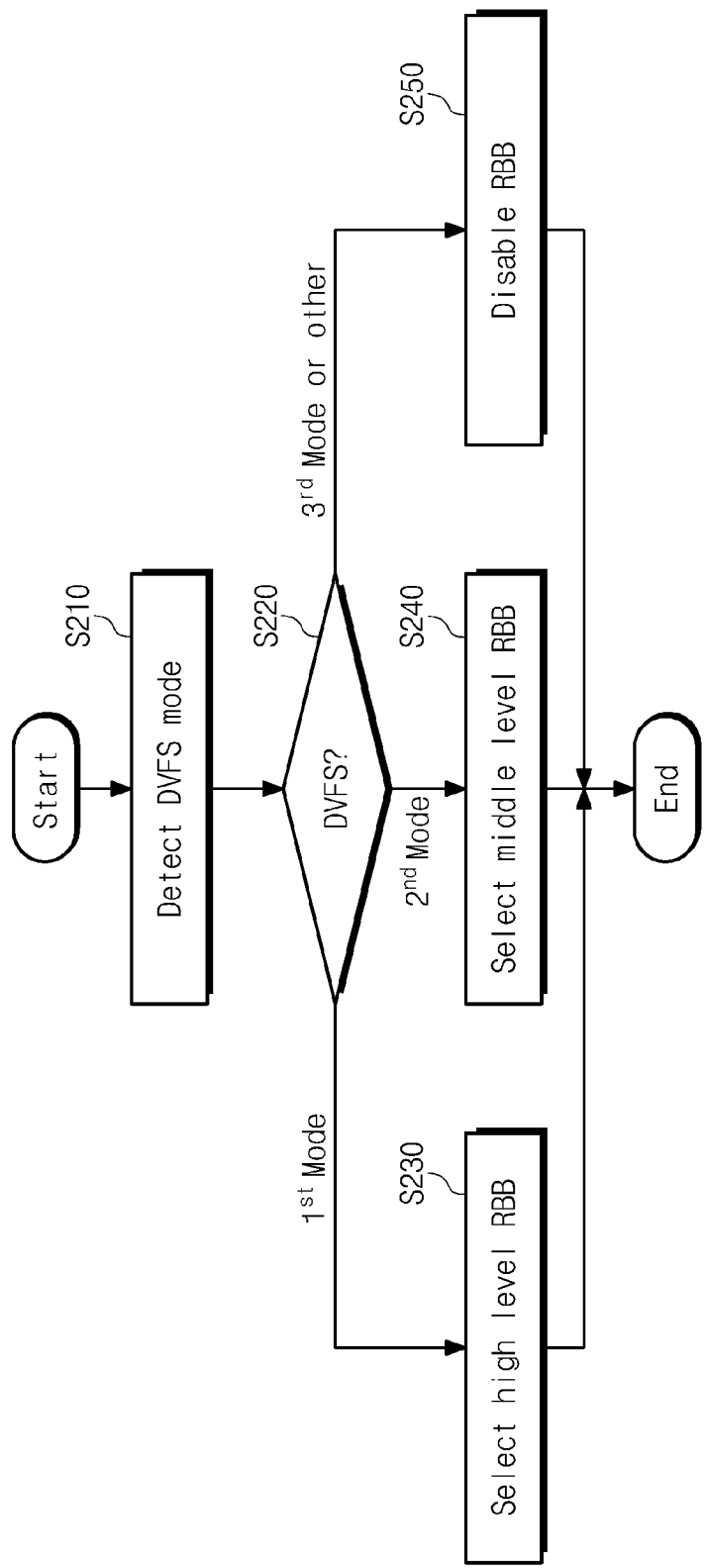
FIG. 7A is a flowchart illustrating a temperature control method capable of selecting various body bias levels according to an embodiment.

FIG. 7A is a flowchart illustrating a temperature control method capable of selecting various body bias levels according to an embodiment. Referring to FIG. 7A, activation of a body bias regulating operation and a body bias level may be selected according to a DVFS mode in FIG. 6.

In operation S210, a control unit 120 may detect a current DVFS mode. Various DVFS modes may be determined according to a level of a driving voltage VDD and a frequency of a driving clock CLK provided to a function block 150. For ease of description, embodiments will be described using DVFS modes illustrated in FIG. 6.

In operation S220, if a current DVFS mode detected by the control unit 120 corresponds to a first DVFS mode (VDD=2.0V, f=3.0 GHz), the method proceeds to operation S230. When the current DVFS mode detected by the control unit 120 corresponds to a second DVFS mode (VDD=1.5V, f=2.0 GHz), the method proceeds to operation S240. In the event that the current DVFS mode detected by the control unit 120 corresponds to a third DVFS mode (VDD=1.3V, f=1.5 GHz) or other DVFS modes, the method proceeds to operation S250.

In operation S230, the control unit 120 may select and activate a high-level body bias regulating operation. That is, the control unit 120 may control a body bias generator 160 such that an absolute value of a body voltage Vrbb for transistors included in the function block 150 is set to the highest value. In this case, an idle current flowing between sources and drains of transistors in the function block 150 may be minimized.

In operation S240, the control unit 120 may select and activate a middle-level body bias regulating operation. That is, the control unit 120 may control the body bias generator 160 such that an absolute value of a body voltage Vrbb for transistors included in the function block 150 is set to a middle value of setting values.

In operation S250, the control unit 120 may inactivate a body bias regulating operation. That is, the control unit 120 may control the body bias generator 160 such that a default value is provided as a body voltage Vrbb for transistors included in the function block 150.

As various body bias regulating levels are used according to a voltage-frequency mode described with reference to FIG. 7A, it possible to provide an optimum operating environment capable of minimizing an increase in temperature and lowering of the performance.

Figure 7B:
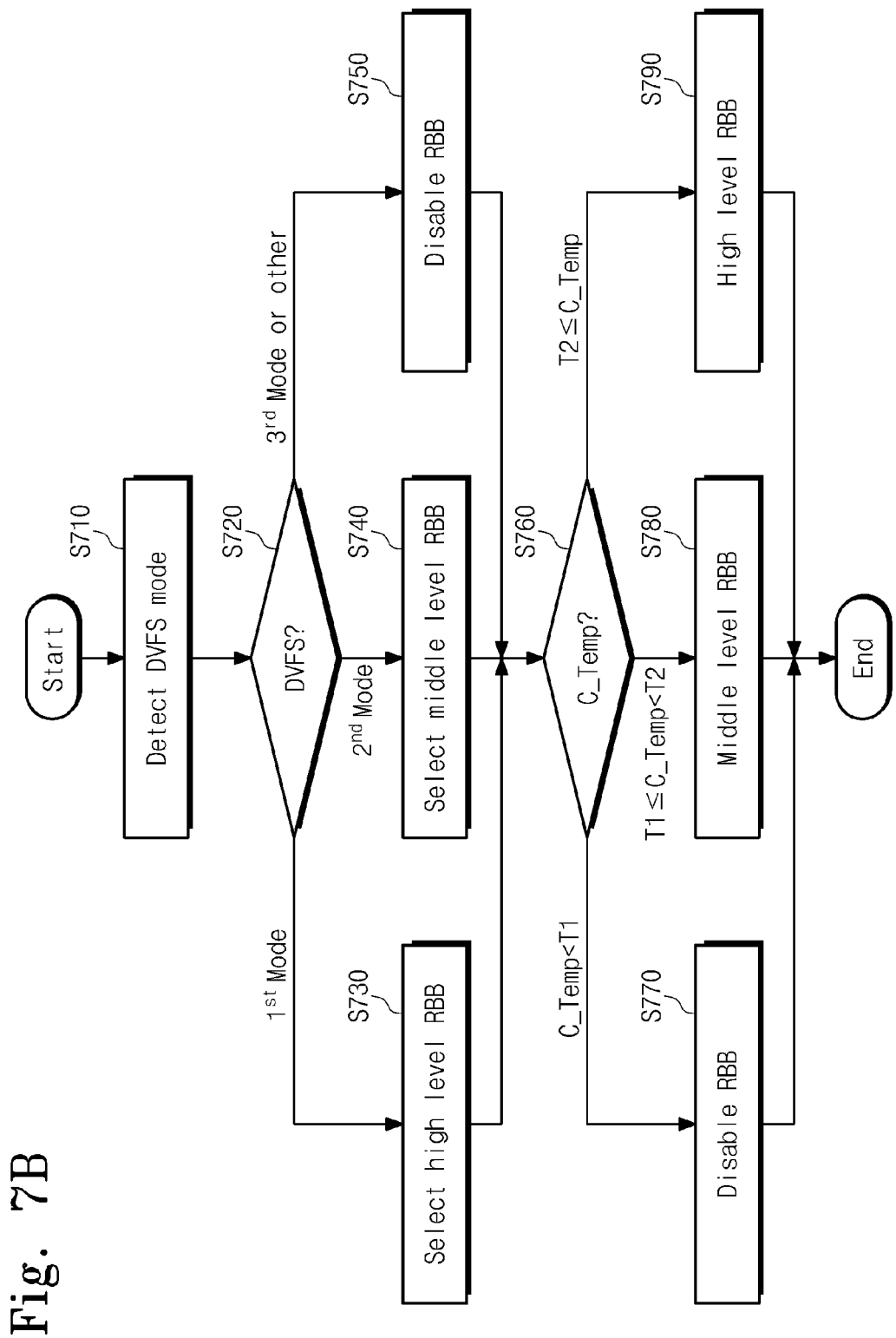
FIG. 7B is a flowchart illustrating a temperature control method capable of selecting and adjusting body bias levels according to an embodiment.

FIG. 7B is a flowchart illustrating a temperature control method capable of selecting and adjusting body bias levels according to an embodiment.

In operation S710, a control unit 120 may set a DVFS mode. The DVFS modes may set a level of a driving voltage VDD and a frequency of a driving clock CLK provided to a function block 150. For ease of description, embodiments will be described using DVFS modes illustrated in FIG. 6. Various DVFS modes may be set according to a driving performance of the semiconductor device and/or a power dissipation of the semiconductor device. However, embodiments are not limited thereto.

In operation S720, if a set DVFS mode corresponds to a first DVFS mode (VDD=2.0V, f=3.0 GHz), the method proceeds to operation S730. When the set DVFS mode corresponds to a second DVFS mode (VDD=1.5V, f=2.0 GHz), the method proceeds to operation S740. In the event that the set DVFS mode corresponds to a third DVFS mode (VDD=1.3V, f=1.5 GHz) or other DVFS modes, the method proceeds to operation S750.

In operation S730, the control unit 120 may select and activate a high-level body bias regulating operation. That is, the control unit 120 may control a body bias generator 160 such that an absolute value of a body voltage Vrbb for transistors included in the function block 150 is set to the highest value. In this case, an idle current flowing between sources and drains of transistors in the function block 150 may be minimized.

In operation S740, the control unit 120 may select and activate a middle-level body bias regulating operation. That is, the control unit 120 may control the body bias generator 160 such that an absolute value of a body voltage Vrbb for transistors included in the function block 150 is set to a middle value of setting values.

In operation S750, the control unit 120 may inactivate a body bias regulating operation. That is, the control unit 120 may control the body bias generator 160 such that a default value is provided as a body voltage Vrbb for transistors included in the function block 150.

In operation S760, the control unit 120 may determine whether the internal temperature C_Temp is included in any temperature range. If the internal temperature C_Temp is less than a first reference temperature T1, the method proceeds to operation S770. If the internal temperature C_Temp is greater than the first reference temperature T1 and is lower than a second reference T2, the method proceeds to operation S780. When the internal temperature C_Temp is greater than the second reference temperature T2, the method proceeds to operation S790.

In operation S770, since the internal temperature C_Temp is less than the first reference temperature T1, the control unit 120 may inactivate the body bias regulating operation. That is, the control unit 120 may control a body bias generator 160 such that a body voltage Vrbb provided to a function block 150 is set to a default value.

In operation S780, the control unit 120 may activate the middle-level body bias regulating operation In operation S790, the control unit 120 may activate the high-level body bias regulating operation.

Figure 8:
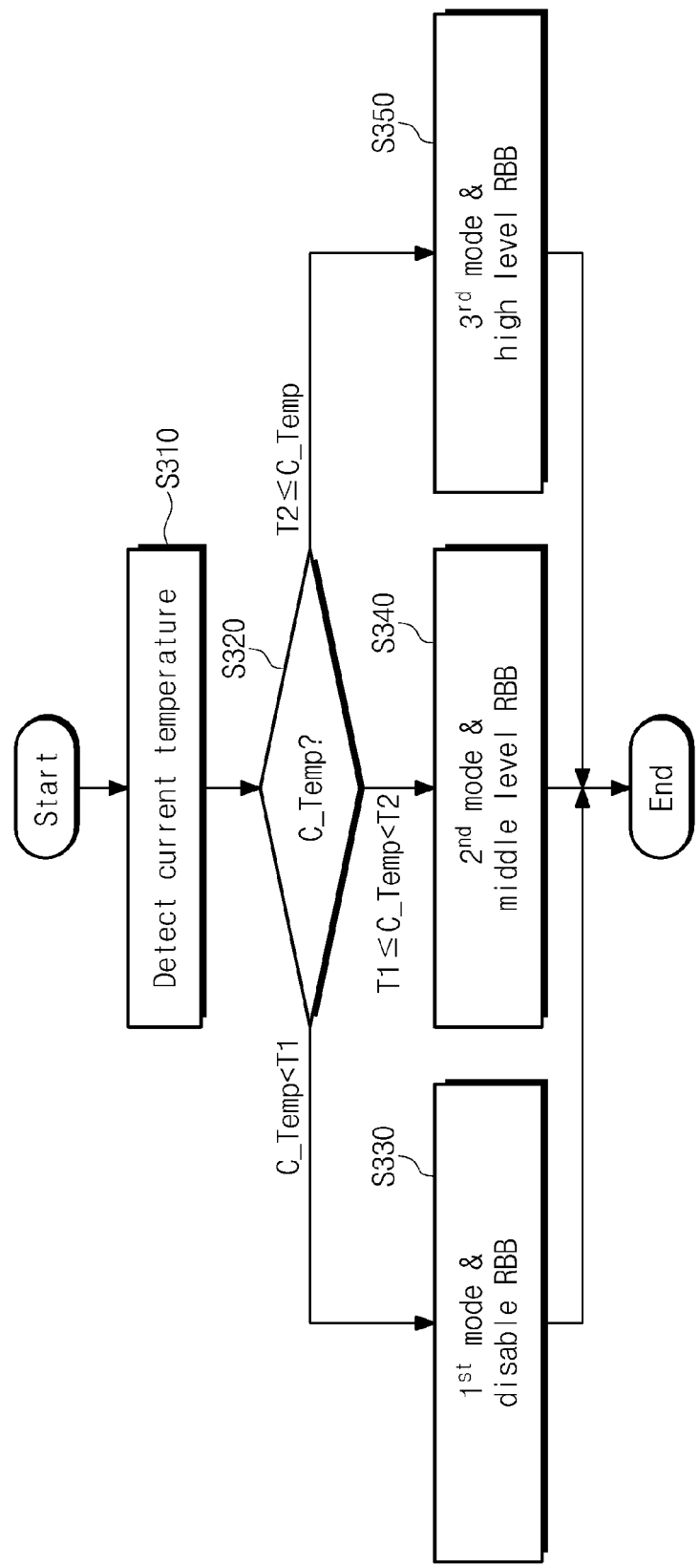
FIG. 8 is a flowchart illustrating a temperature control method according to another embodiment.

As various body bias regulating levels are used according to a voltage-frequency mode described with reference to FIG. 7B, it possible to provide an optimum operating environment capable of minimizing an increase in temperature and lowering of the performance. Further, the body bias regulating level may be selected according to a current driving temperature of the semiconductor device 100. In this case, if an internal temperature of the semiconductor device 100 increases, a body bias regulating level may be selected to be higher. Thus, it is possible to effectively compensate lowering of the performance of the semiconductor device 100 dependent on a temperature FIG. 8 is a flowchart illustrating a temperature control method according to another embodiment. Modes in FIG. 6 may be selected according to a required performance. Also, the modes in FIG. 6 may be selected to control a temperature. Referring to FIG. 8, various voltage-frequency modes and body bias regulating levels may be selected according to a current internal temperature C_Temp of a semiconductor device 100.

In operation S310, a control unit 120 may detect an internal temperature C_Temp of the semiconductor device 100. The control unit 120 may detect a level of the internal temperature C_Temp based on real-time temperature data provided from a temperature sensor 110.

In operation S320, the control unit 120 may determine whether the internal temperature C_Temp is included in any temperature range. If the internal temperature C_Temp is less than a first reference temperature T1, the method proceeds to operation S330. If the internal temperature C_Temp is greater than the first reference temperature T1 and is lower than a second reference T2, the method proceeds to operation S340. When the internal temperature C_Temp is greater than the second reference temperature T2, the method proceeds to operation S350.

In operation S330, since the internal temperature C_Temp is less than the first reference temperature T1, the control unit 120 may select a first DVFS mode (VDD=2.0V, f=3.0 GHz) as for thermal throttling. Further, the control unit 120 may inactivate a body bias regulating operation. That is, the control unit 120 may control a body bias generator 160 such that a body voltage Vrbb provided to a function block 150 is set to a default value.

In operation S340, the control unit 120 may select a second DVFS mode (VDD=1.5V, f=2.0 GHz) for thermal throttling. The control unit 120 may activate a middle-level body bias regulating operation.

In operation S350, the control unit 120 may select a third DVFS mode (VDD=1.3V, f=1.5 GHz) for thermal throttling. The control unit 120 may activate a high-level body bias regulating operation.

With the above description, a DVFS mode and a body bias regulating level may be selected according to a current driving temperature of the semiconductor device 100. In this case, if an internal temperature of the semiconductor device 100 increases, a body bias regulating level may be selected to be higher, and a voltage-frequency mode may be selected to have a lower driving speed. Thus, it is possible to effectively compensate lowering of the performance of the semiconductor device 100 dependent on a temperature. Of course, embodiments are not limited to temperature and it will be understand that selection of the DVFS mode may be based on power diffusion, idle current, or any other parameters or combinations thereof discussed throughout the disclosure.

Figure 9:
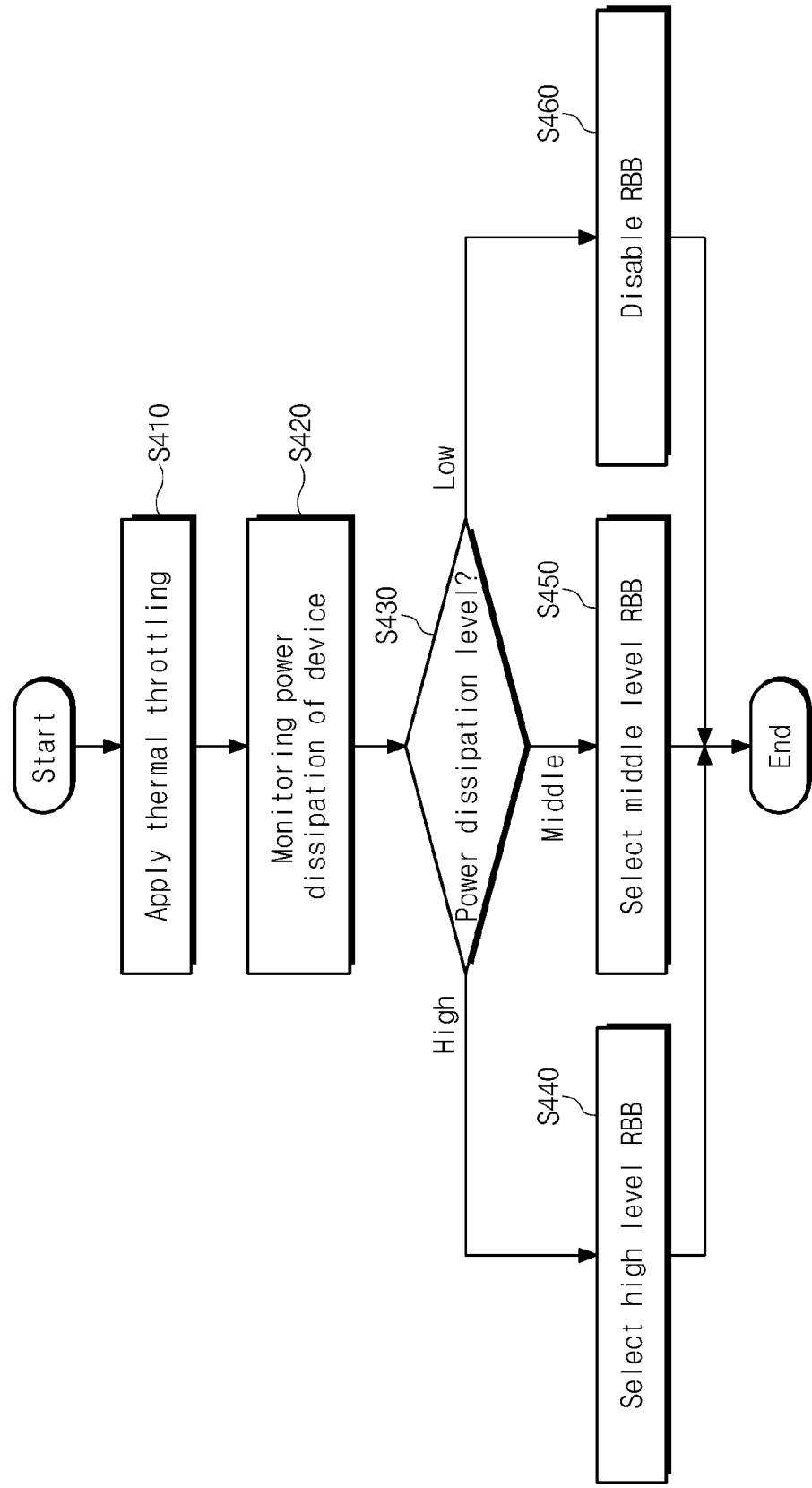
FIG. 9 is a flowchart illustrating a temperature control method according to still another embodiment.

FIG. 9 is a flowchart illustrating a temperature control method according to still another embodiment. Referring to FIG. 9, various body bias regulating levels may be used according to a level of lowering of the performance and a variation in power dissipation over applying thermal throttling to a semiconductor device 100.

In operation S410, a control unit 120 may activate a thermal throttling operation of the semiconductor device 100. Herein, the activated thermal throttling operation may correspond to one of various voltage-frequency modes.

In operation S420, the control unit 120 may detect a level of power dissipation or operating performance provided from a performance monitor 170. Herein, the embodiment will be described on the basis of a monitored level of power dissipation, but the embodiments are not limited to monitored level of power dissipation.

In operation S430, the control unit 120 may determine a quantity of power dissipation as a high level, a middle level, or a low level. The control unit 120 may activate or select a body bias regulating mode according to the determined level of power dissipation. In a case where the quantity of power dissipation is high, the method proceeds to operation S440. When the quantity of power dissipation is middle, the method proceeds to operation S450. If the quantity of power dissipation is low, the method proceeds to operation S460.

In operation S440, the control unit 120 may activate a high-level body bias regulating operation. In this case, absolute values of bias voltages Vrbbp and Vrbbn applied to bodies of transistors may be set to have maximum values of predetermined values. Threshold voltages of transistors may be set to a maximum value according to activation of the high-level body bias regulating operation. A quantity of an idle current between a source and a drain may be minimized.

In operation S450, the control unit 120 may activate a middle-level body bias regulating operation. In this case, absolute values of bias voltages Vrbbp and Vrbbn applied to bodies of transistors may be set to have middle values of predetermined values.

In operation S460, the control unit 120 may disable the body bias regulating operation or activate a low-level body bias regulating operation. In this case, absolute values of bias voltages Vrbbp and Vrbbn applied to bodies of transistors may be set to have default values.

With the above description, a body bias regulating operation may be activated or inactivated according to a current driving performance or power dissipation of the semiconductor device 100.

Figure 10:
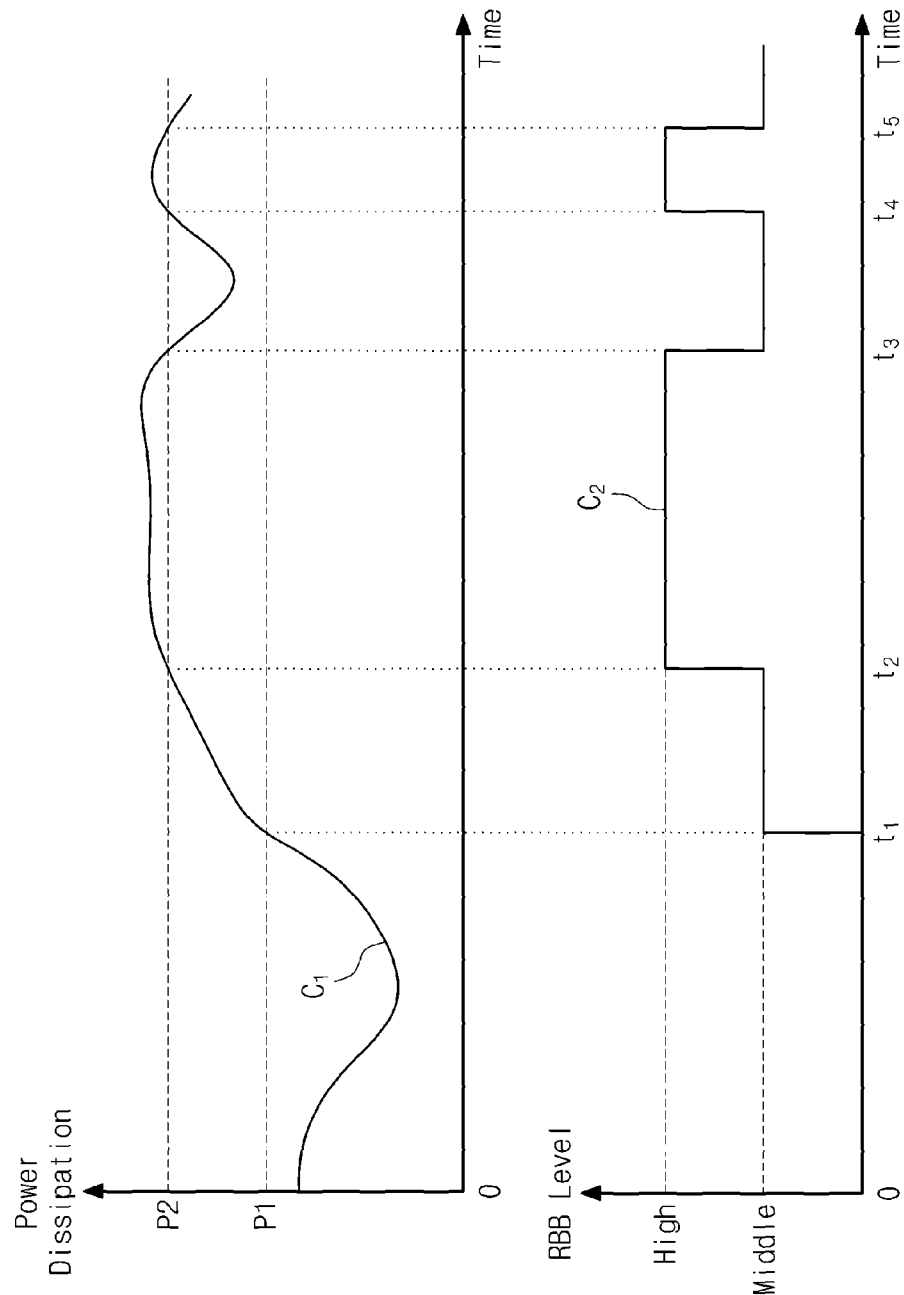
FIG. 10 is a waveform diagram illustrating a temperature control method in FIG. 9.

FIG. 10 is a waveform diagram illustrating a temperature control method in FIG. 9. Referring to FIG. 10, a body bias regulating level may be selected according to power dissipation of a semiconductor device 100.

A curve C1 may indicate a variation in a power consumed by the semiconductor device 100. Power dissipation of the semiconductor device 100 may be less than a first reference level P1 until time t1. A body bias regulating operation may be inactivated before time t1.

However, at time t1, power dissipation of the semiconductor device 100 may exceed the first reference level P1. A variation in power dissipation may be detected by a performance monitor 170. The detected level of power dissipation may be provided to a control unit 120. The control unit 120 may activate a body bias generator 160 when power dissipation exceeds the first reference level P1. In a case where the power dissipation is between the first reference level P1 and a second reference level P2, the control unit 120 may activate a middle level body bias regulating operation.

At time t2 when the power dissipation exceeds the second reference level P2, the control unit 120 may control the body bias generator 160 such that a body bias regulating level increases to a high level. A curve C2 may indicate a variation in a body bias regulating level. At time t3 when the power dissipation is less than the second reference level P2, the control unit 120 may switch a body bias regulating level from the high level to the middle level. Switching of the body bias regulating level may be similarly performed according the same standard at times t4 and t5.

With the above description, a body bias regulating operation may be activated according to a variation in monitored performance or power dissipation. Further, the activated body bias regulating operation may be set to various levels.

Figure 11:
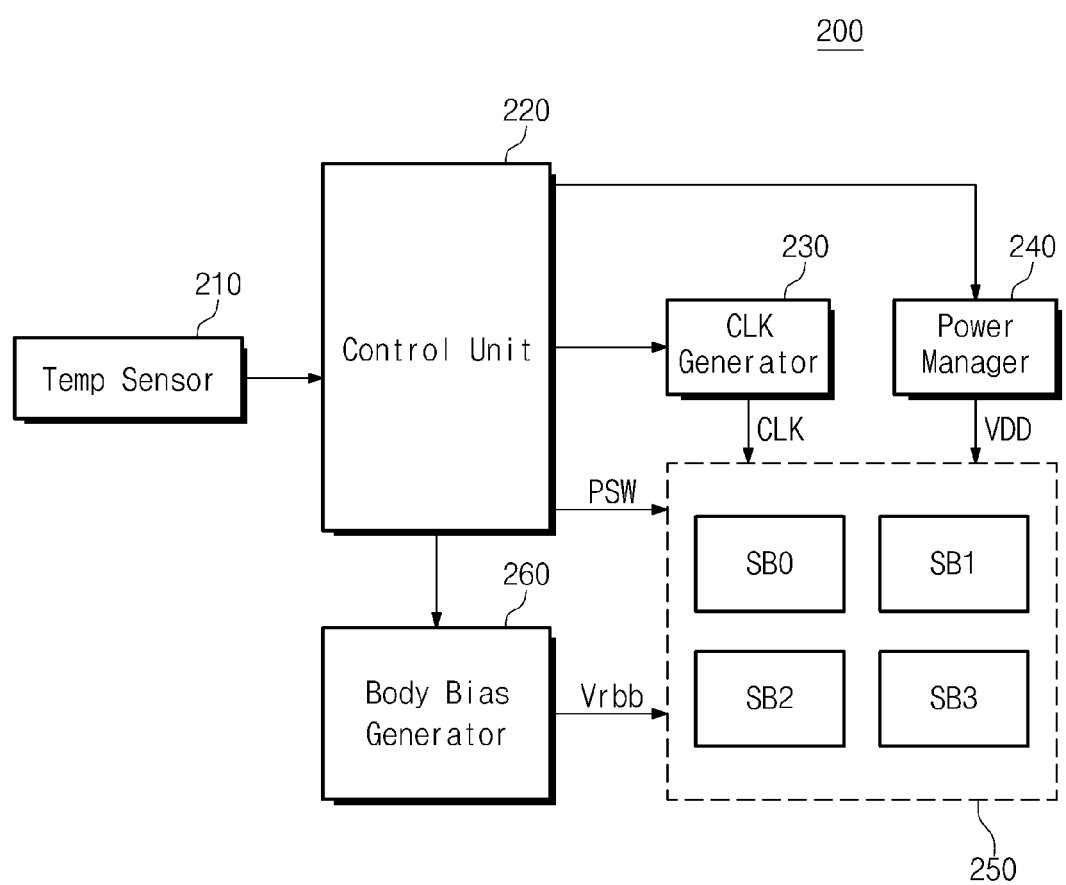
FIG. 11 is a block diagram schematically illustrating a semiconductor device according to another embodiment.

FIG. 11 is a block diagram schematically illustrating a semiconductor device according to another embodiment. Referring to FIG. 11, a semiconductor device 200 may include a function block 250 divided into a plurality of circuit units or sub-blocks SB0 to SB3 that control thermal throttling and body bias regulating independently. Herein, a temperature sensor 210, a clock generator 230, and a power manager 240 in FIG. 11 may be substantially identical to those in FIG. 1, and description thereof is thus omitted.

A control unit 220 may control a level of a driving voltage VDD or a frequency of a driving clock CLK based on an internal temperature of the semiconductor device 200. The control unit 220 may perform various thermal throttling modes by controlling a level of a driving voltage VDD or a frequency of a driving clock CLK.

For example, if an internal temperature of the semiconductor device 200 exceeds a reference temperature, the control unit 220 may control a power manager 240 such that a level of the driving voltage VDD is lowered. Alternatively, if the internal temperature of the semiconductor device 200 exceeds the reference temperature, the control unit 220 may control a clock generator 230 such that a frequency of the driving clock CLK decreases. The control unit 220 may provide a switching signal PSW for blocking the driving voltage VDD of a function block 250 based on the internal temperature of the semiconductor device 200.

The control logic 220 may regulate a level of an idle current by controlling a body bias together with a thermal throttling operation. For example, the control logic 220 may change a body bias condition in view of at least one of an internal temperature, a level of a thermal throttling operation, a current performance, power dissipation, and process variations associated with the semiconductor device 200. The control unit 220 may control a body bias generator 260 to change a body bias of the function block 250.

Under the control of the control unit 220, the clock generator 230 and the power manager 240 may provide the driving clock CLK and the driving voltage VDD to the sub blocks SB0 to SB3 of the function block 250 to apply different levels of thermal throttling.

The function block 250 may include the sub blocks SB0 to SB3 configured to perform thermal throttling and body bias regulating operations independently. The sub blocks SB0 to SB3 may include circuits necessitating securing both the speed and the performance. On the other hand, the sub blocks SB0 to SB3 may include circuits necessitating securing the reliability, not the speed and the performance. An idle current of any sub block may be varied to be susceptible to a temperature, and a variation in an idle current of any sub block according to a temperature may be ignorable. The sub blocks SB0 to SB3 may be configured such that thermal throttling or body bias regulating is used variably or fixedly according to a required characteristic.

The body bias generator 260 may provide body bias voltages Vrbb each corresponding to the sub blocks SB0 to SB3 of the function block 250. For example, a first body voltage Vrbb1 may be provided to the sub block SB0, and a second body voltage Vrbb2 higher than the first body voltage Vrbb1 may be provided to the sub block SB1. Body voltages provided to PMOS and NMOS transistors in the same sub block may be controlled differently.

With the above-described semiconductor device 200, thermal throttling and body bias regulating may be applied to circuits having different operating characteristics at the same time. Thus, it is possible to control a temperature in optimum through various levels of thermal throttling and body bias regulating according to operating characteristics of circuits. Herein, the semiconductor device 200 may be a system on chip SoC. In this case, the sub blocks SB0 to SB3 may be classified by the intellectual property. Alternatively, the sub blocks SB0 to SB3 may be formed of a function block larger than the intellectual property of the SoC or of a function block smaller than the intellectual property of the SoC.

Figure 12:
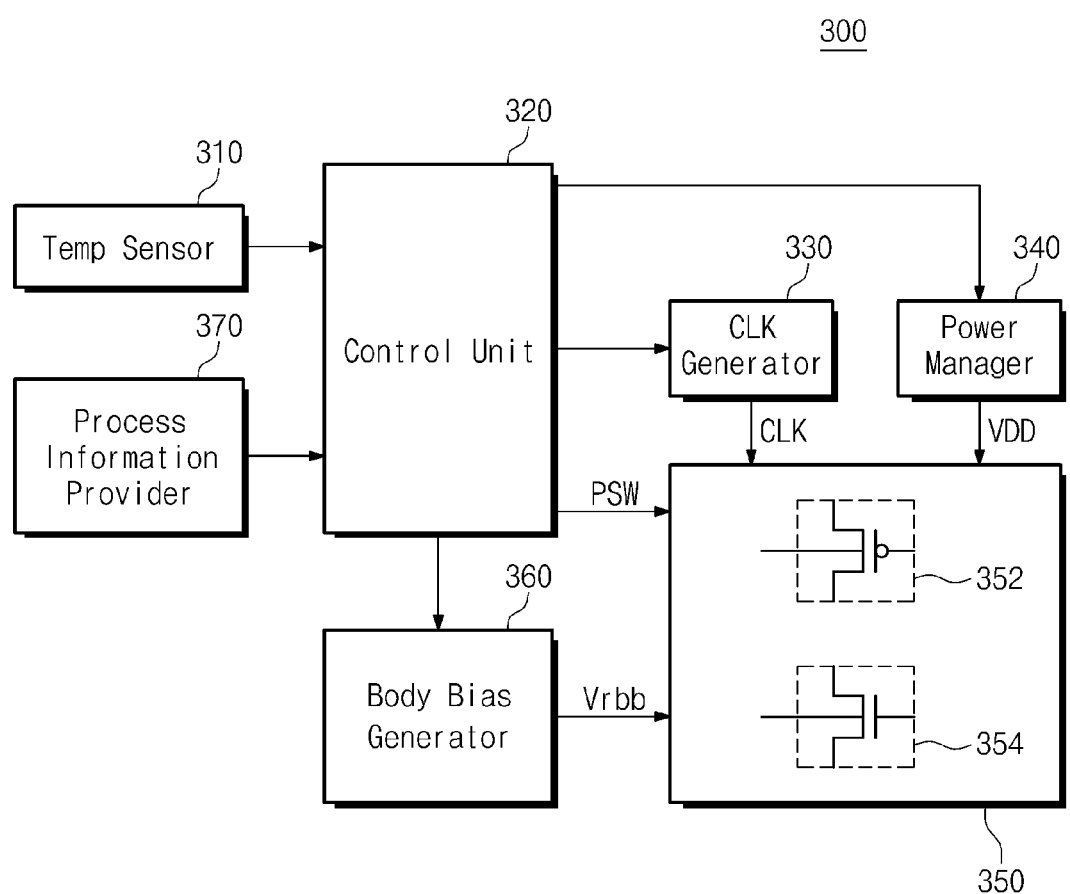
FIG. 12 is a block diagram schematically illustrating a semiconductor device according to another embodiment.

FIG. 12 is a block diagram schematically illustrating a semiconductor device according to another embodiment. In a semiconductor device 300 in FIG. 12, body bias regulating and thermal throttling may be applied according to a process property of a transistor. The semiconductor device 300 may include a process information provider 370. In FIG. 12, constituent elements 310, 330, 340, 350, and 360 may be substantially identical to like elements in FIG. 1, and description thereof is thus omitted.

The process information provider 370 may provide information associated with a process property. Chips may have various operating properties due to a process error. Manufactured chips may be divided into good dies or bad dies according to a process property. Although chips selected as good dies have the same circuit structure, operating properties of transistors forming circuits may vary according to a process error. The process information provider 370 may provide the control unit 320 with operating properties of transistors such as information associated with a level of idle current. The process information provider 320 may monitor idle currents of PMOS and NMOS transistors to provide the control unit 320 with information associated with the monitored level of idle current. Alternatively, the process information provider 320 may be configured to provide the level of idle current, measured at a test level, using a programmed fuse option. Further, the process information provider 320 may be configured to provide decision information associated with activation or inactivation of body bias regulating.

The control unit 320 may control a body bias generator 360 based on level information of idle current or information associated with activation of body bias regulating provided from the process information provider 370. The control unit 320 may selectively apply thermal throttling and body bias regulating based on information from a temperature sensor 310 and the process information provider 370. Various combinations of the thermal throttling and the body bias regulating executed by the control unit 320 may be any of the above-described embodiments.

Figure 13A:
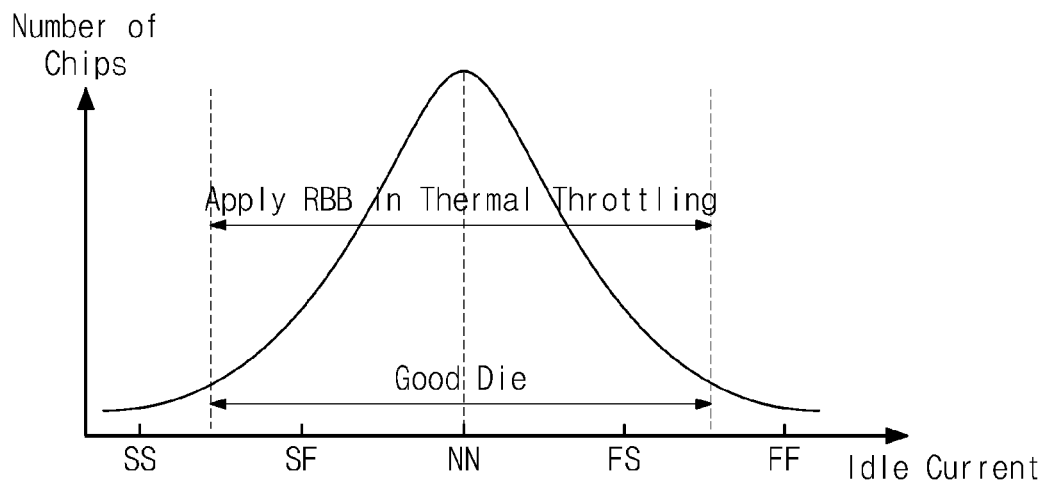
FIG. 13A is a diagram illustrating an idle current distribution of semiconductor chips configured to perform both thermal throttling and body bias regulating.

FIG. 13A is a diagram illustrating an idle current distribution of semiconductor chips configured to perform both thermal throttling and body bias regulating.

Referring to FIG. 13A, semiconductor chips may be divided into five groups according to an idle current level of a transistor, for example. In FIG. 13A, a horizontal axis may indicate idle currents of PMOS and NMOS transistors 352 and 354. For example, semiconductor chips may be divided into SS, SF, NN, FS, and FF groups according to quantities of idle currents of transistors. The SS group may indicate the case that idle currents of the PMOS and NMOS transistors 352 and 354 are at a minimum level. The SF group may indicate the case that an idle current of the PMOS transistor 352 is at a maximum level and an idle current of the NMOS transistor 354 is at a minimum level. The NN group may indicate the case that idle currents of the PMOS and NMOS transistors 352 and 354 are at a middle level. The FS group may indicate the case that an idle current of the PMOS transistor 352 is at a minimum level and an idle current of the NMOS transistor 354 is at a maximum level. The NN group may indicate the case that idle currents of the PMOS and NMOS transistors 352 and 354 are at a maximum level.

When semiconductor chips are divided according to an idle current level, semiconductor chips having a property between the SS group and the FF group may be determined to be good. The good chips may be configured to perform both a thermal throttling operation and a body bias regulating operation. In the event that the body bias regulating operation is applied to all good chips, a driving speed of a chip of which an idle current is relatively less may be lowered. To compensate this phenomenon, such a chip that an idle current is relatively less may be configured to increase a level of a driving voltage VDD at a thermal throttling operation.

Figure 13B:
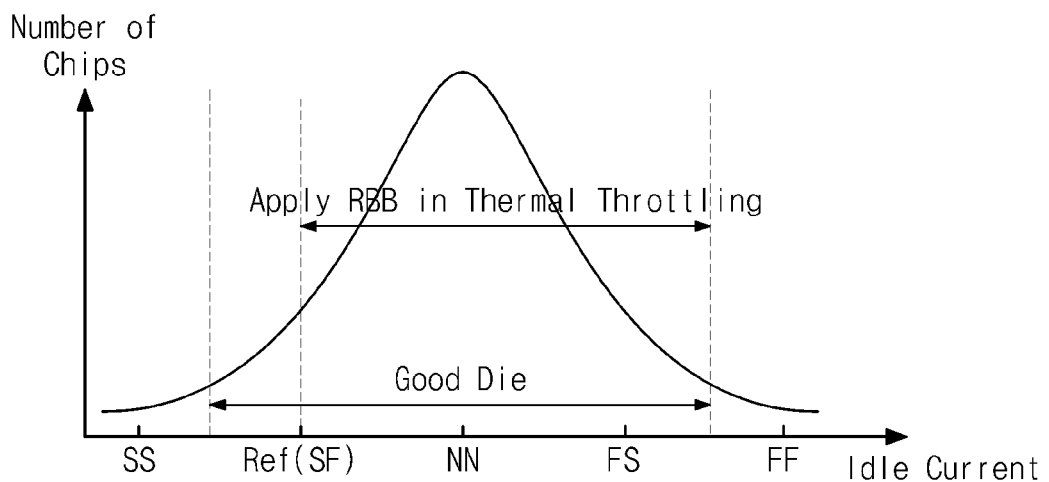
FIG. 13B is a diagram illustrating a distribution of chips set such that both thermal throttling and body bias regulating are simultaneously applied to semiconductor chips, having an idle current problem, from among semiconductor chips selected as good dies.

FIG. 13B is a diagram illustrating a distribution of chips configured such that both thermal throttling and body bias regulating are simultaneously applied to semiconductor chips, having an idle current problem, from among semiconductor chips selected as good dies.

Referring to FIG. 13B, such chips that an idle current is relatively much may be configured to perform both a thermal throttling operation and a body bias regulating operation. A thermal throttling operation may be applied to chips that idle currents of PMOS and NMOS transistors 352 and 354 are below a references Ref (e.g., an SF group). On the other hand, both a thermal throttling operation and a body bias regulating operation may be applied to chips that idle currents of PMOS and NMOS transistors 352 and 354 are much. If a body bias regulating technique is applied only to chips that a driving speed of a transistor is rapid, a speed according to the body bias regulating does not matter. In this case, controlling of a driving voltage according to the body bias regulating may not be applied.

On the other hand, in the event that a level of a driving voltage VDD optimized according to a quantity of idle current is decided, an optimized level of the driving voltage VDD may be defined newly to compensate for lowering of a speed when the body bias regulating operation is activated.

Figure 14:
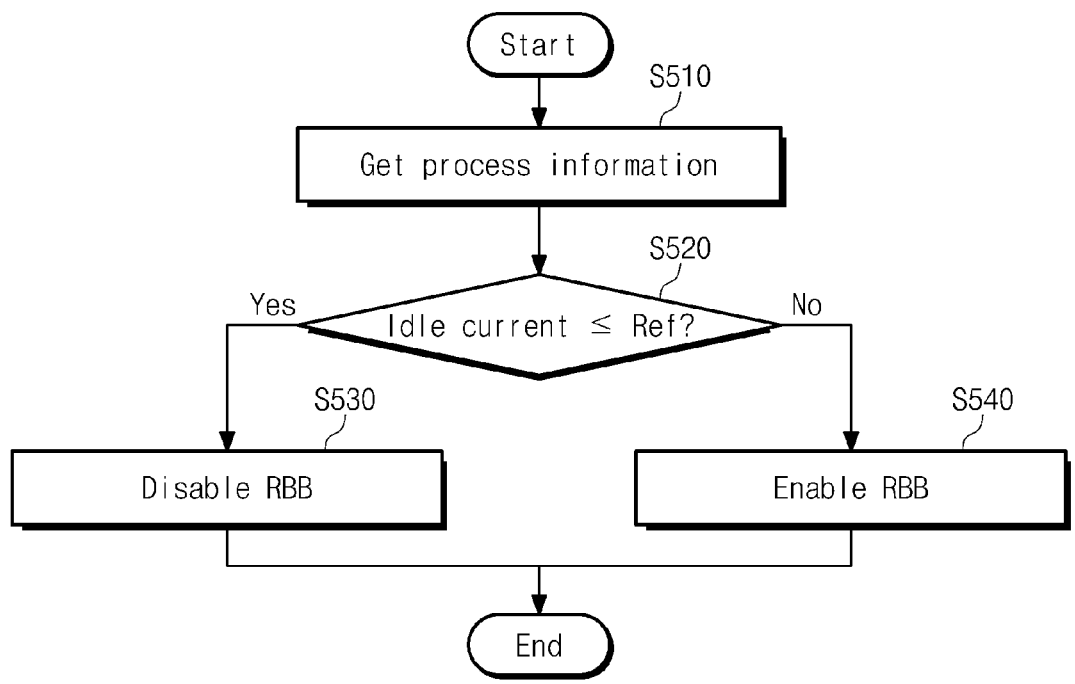
FIG. 14 is a flowchart illustrating a temperature control method executed with reference to process information described in FIG. 13B.

FIG. 14 is a flowchart illustrating a temperature control method executed with reference to process information illustrated in FIG. 13B. Referring to FIGS. 12 to 14, whether a body bias regulating operation is applied may be determined according to process information of a semiconductor device together with applying of a thermal throttling operation.

In operation S510, a process information provider 370 may provide a control unit 320 with process information of the semiconductor device 300. The process information provider 370 may be formed of a fuse option or a monitor circuit measuring a level of idle current. Herein, the process information is assumed to be information, illustrated in FIG. 13B, indicating quantities of idle currents of PMOS and NMOS transistors 352 and 354 of the semiconductor device 300.

In operation S520, the control unit 320 may judge whether a level of idle current of the semiconductor device 320 is greater than a reference level Ref. If the level of idle current of the semiconductor device 320 is not greater than the reference level Ref, the method proceeds to operation S530. If the level of idle current of the semiconductor device 320 is greater than the reference level Ref, the method proceeds to operation S540.

In operation S530, under the control of the control unit 320, a thermal throttling operation may be used to control a temperature without using a body bias regulating operation, and the body bias regulating operation is not enabled. Thus, when a temperature increases, a frequency of a driving clock and a level of a driving voltage may be regulated.

In operation S540, under the control of the control unit 320, the combination of a thermal throttling operation and a body bias regulating operation may be used to control a temperature of the semiconductor device 300. This operation may be performed in the same manner as described with reference to the above embodiments, and description thereof is thus omitted.

Figure 15:
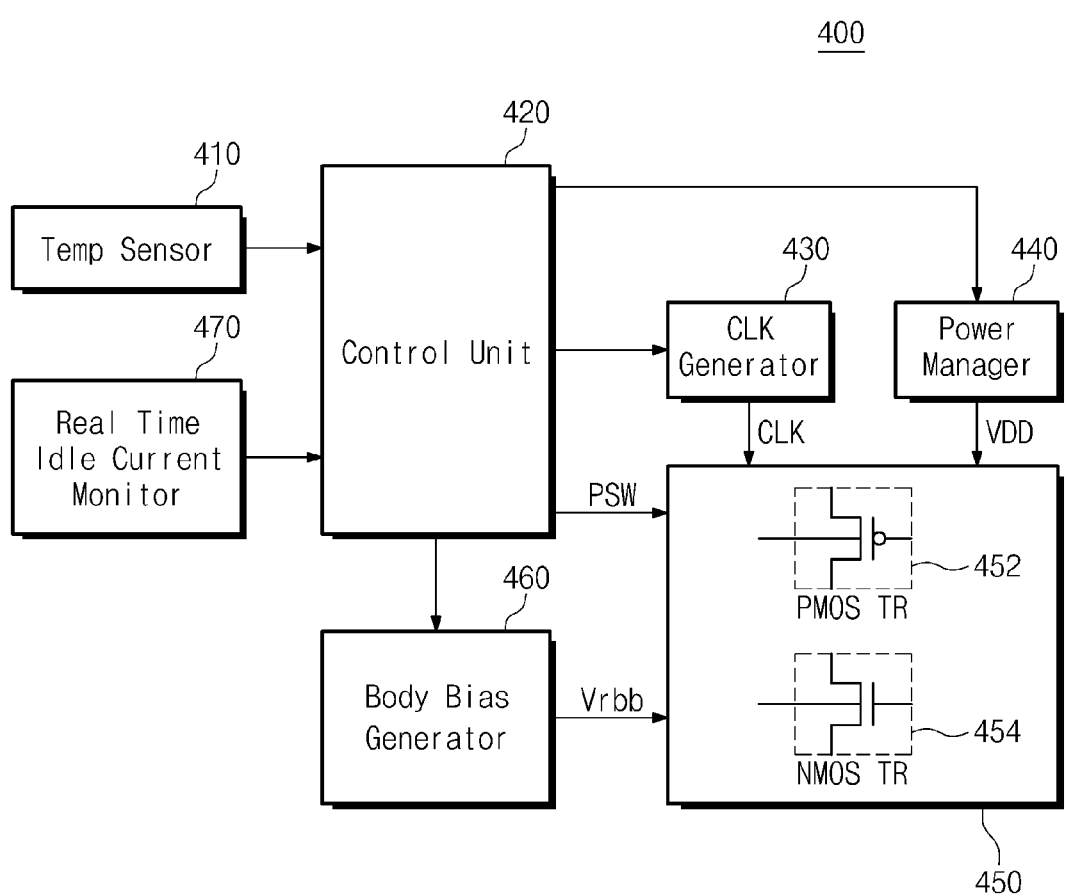
FIG. 15 is a block diagram schematically illustrating a semiconductor device according to still another embodiment.

FIG. 15 is a block diagram schematically illustrating a semiconductor device according to still another embodiment. A semiconductor device 400 may be configured to perform a body bias regulating operation by monitoring an idle current of a semiconductor element (e.g., a transistor) in real time. Referring to FIG. 15, the semiconductor device 400 may include a real time idle current monitor 470.

In FIG. 15, constituent elements 410, 430, 440, 450, and 460 may be substantially identical to like elements in FIG. 1, and description thereof is thus omitted.

The real time idle current monitor 470 may monitor idle currents of elements (e.g., transistors) of the semiconductor device 400. The idle current may vary according to a process, a temperature, a driving voltage VDD, and various driving conditions. In particular, a variation in an idle current due to a temperature may be controlled indirectly through thermal throttling. Also, an idle current varying according to a driving voltage VDD or a clock frequency may be controlled according to an embodiment in FIG. 1. A deviation of an idle current due to a process error may be compensated through an embodiment described with reference to FIG. 12. However, a variation of an idle current may be detected by measuring an idle current level in real time.

The real time idle current monitor 470 may measure idle currents flowing at elements of the semiconductor device 400 to provide the real time measurements to a control unit 420. The real time idle current monitor 470 may include a separate monitoring element for monitoring an idle current provided within the semiconductor device 400. In this case, the time idle current monitor 470 may measure an idle current by measuring a current flowing at terminals (e.g., a source, a drain, and a body) of a monitoring element. A measured idle current level may be provided to the control unit 420 as a quantification value.

The control unit 420 may decide a level of a body bias based on information associated with a level of idle current provided from the real time idle current monitor 470. When an idle current level is below a reference, the control unit 420 may control a body bias generator 460 to disable a body bias regulating operation. However, the control unit 420 may control the body bias generator 460 to increase a body bias in proportion to an increase in an idle current level.

The control unit 420 may control the body bias generator 460 based on real-time idle current level information provided from the real time idle current monitor 470. The control unit 420 may perform a thermal throttling operation and a body bias regulating operation based on a real-time temperature provided from a temperature sensor 410 and real-time idle current information provided from the real time idle current monitor 470.

The body bias regulating operation may be executed according to a level of idle current measured in real time. Thus, a body bias may be regulated directly according to an idle current, not parameters such as a temperature, a process error, and a driving voltage.

Figure 16:
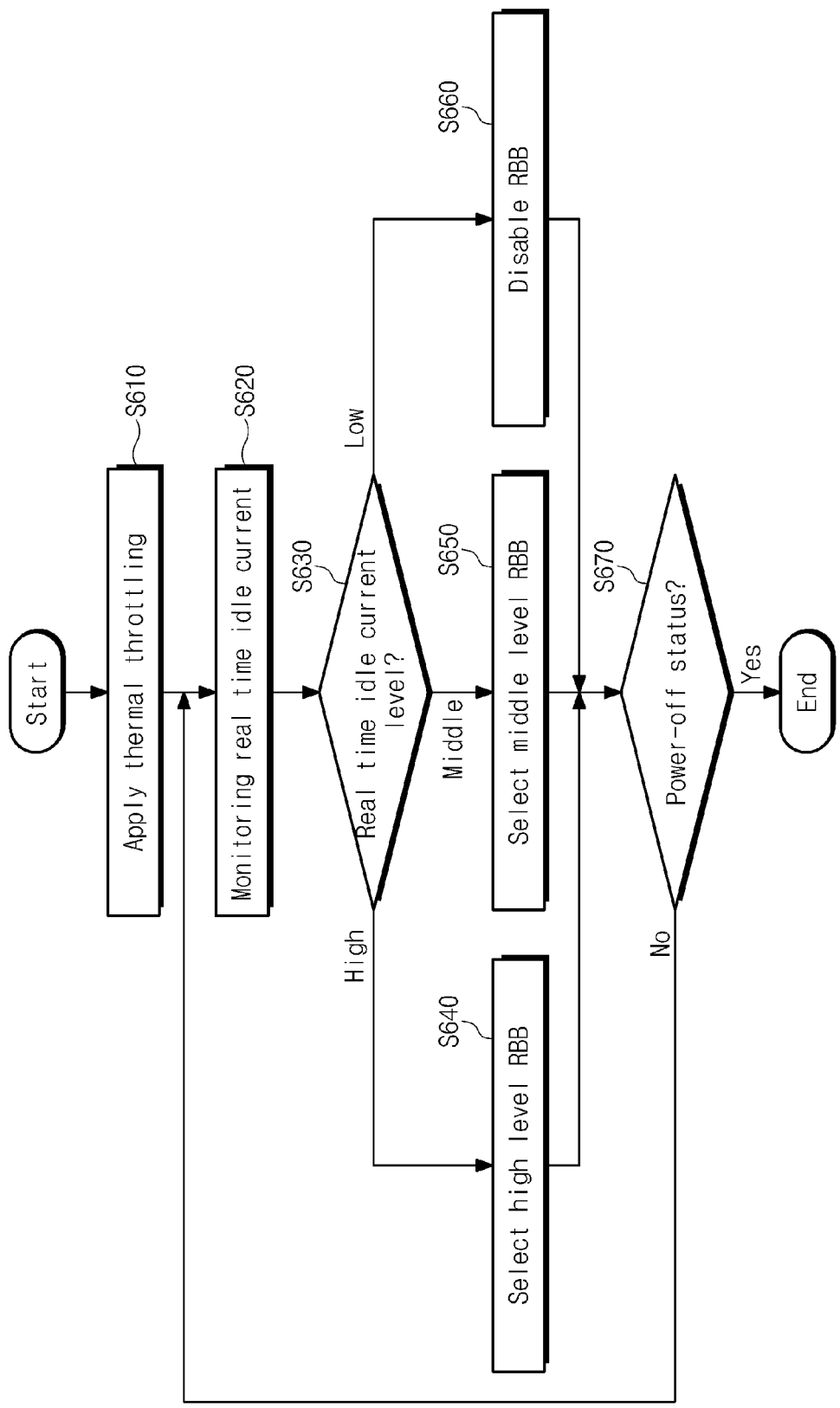
FIG. 16 is a flowchart illustrating a temperature control method of a semiconductor device in FIG. 15.

FIG. 16 is a flowchart illustrating a temperature control method of a semiconductor device in FIG. 15. In a semiconductor device 400, various body bias regulating levels may be applied according to an idle current measured in real time during a time when a thermal throttling operation is applied.

In operation S610, a control unit 420 may activate a thermal throttling operation of a semiconductor device 400. The activated thermal throttling operation may correspond to one of various voltage-frequency modes.

In operation S620, the control unit 420 may detect a level of idle current provided in real time from a real time idle current monitor 470. Herein, an idle current level may be divided into various levels. For ease of description, an idle current level may be divided into a high level, a middle level, and a low level.

In operation S630, the control unit 420 may judge an idle current level. The control unit 420 may activate or select a body bias regulating mode according to the judged level of idle current. When an idle current level is judged to be high, the method proceeds to operation S640. If an idle current level is judged to be middle, the method proceeds to operation S650. When an idle current level is judged to be low, the method proceeds to operation S660.

In operation S640, the control unit 420 may activate a high-level body bias regulating mode. In this case, absolute values of bias voltages Vrbbp and Vrbbn applied to bodies of transistors may be set to a maximum value of predetermined values. As a high-level body bias regulating mode is activated, threshold voltages of transistors may be set to a maximum value. Also, a quantity of idle current between a source and a drain may be reduced.

In operation S650, the control unit 420 may activate a middle-level body bias regulating mode. In this case, absolute values of bias voltages Vrbbp and Vrbbn applied to bodies of transistors may be set to a middle value of predetermined values.

In operation S660, the control unit 420 may disable the body bias regulating or activate a low-level body bias regulating mode. In this case, absolute values of bias voltages Vrbbp and Vrbbn applied to bodies of transistors may be set to a default value.

In operation S670, the control unit 420 may determine a continuation of a body bias regulating operation based on a power status. For example, the control unit 420 may judge whether a power of the semiconductor device 400 is at a power-off status. The control unit 420 may determine a continuation of the body bias regulating operation based on the judgment result. If a power is at a power-off status, the method may be ended. If a power is not at a power-off status, the method proceeds to operation S620.

Figure 17:
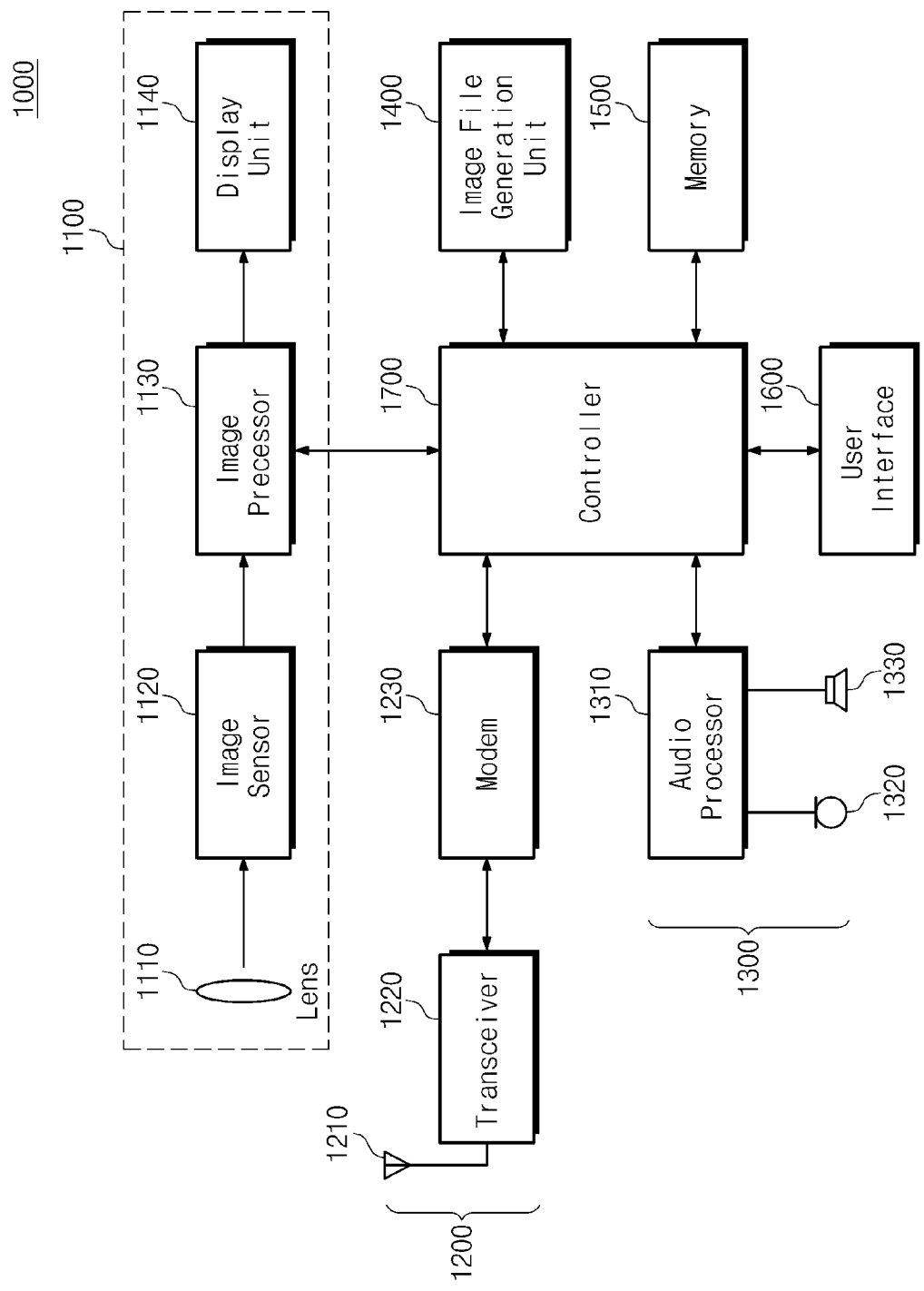
FIG. 17 is a block diagram schematically illustrating a handheld terminal including a semiconductor device according to an embodiment.

FIG. 17 is a block diagram schematically illustrating a handheld terminal including a semiconductor device according to an embodiment. Referring to FIG. 17, a handheld terminal 1000 may include an image processing unit 1100, a wireless transceiver 1200, an audio processing unit 1300, an image file generation unit 1400, a memory 1500, a user interface 1600, and a controller 1700. The image processing unit 1100 may include a lens 1110, an image sensor 1120, an image processor 1130, and a display unit 1140. The wireless transceiver 1200 may include an antenna 1210, a transceiver 1220, and a modem 1230. The audio processing unit 1300 may include an audio processor 1310, a microphone 1320, and a speaker 1330.

The handheld terminal 1000 may include various types of semiconductor devices. In particular, an application processor may perform a function of the controller 1700, and may necessitate low power and high performance. To satisfy such requirements, the controller 1700 may be provided by a multi-core form according to a refinement process. A low-power and high-performance processor may be formed by using a temperature control method in which a body bias regulating operation and a thermal throttling operation according to an embodiment are performed.

There may be described the case that such a manner that a body bias regulating operation and a thermal throttling operation are performed in parallel is applied to the controller 1700. However, the inventive concept is not limited thereto. For example, the temperature control manner is applicable to chips including the image processing unit 1100, the wireless transceiver 1200, the audio processing unit 1300, the image file generation unit 1400, the memory 1500, and the like. Also, the chips may be formed by a system on chip form.

Figure 18:
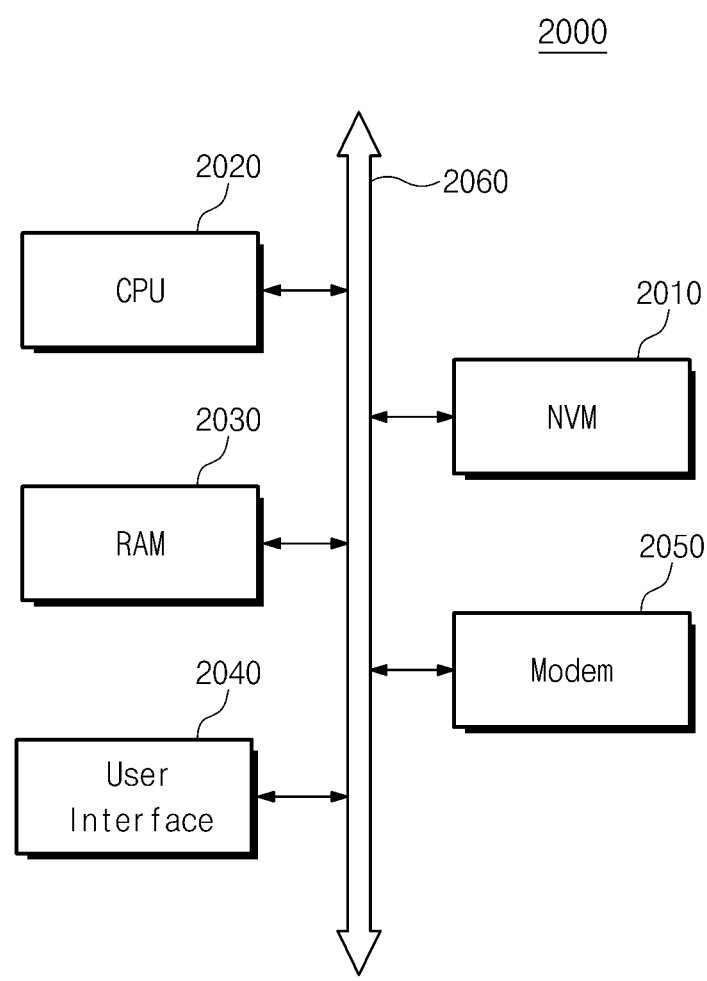
FIG. 18 is a block diagram schematically illustrating a computer system performing a temperature control operation according to an embodiment.

FIG. 18 is a block diagram schematically illustrating a computer system performing a temperature control operation according to an embodiment. Referring to FIG. 18, a computer system 2000 may include a nonvolatile memory 2010, a CPU 2020, a RAM 2030, a user interface 2040, a modem 2050 (e.g., a baseband chipset) which are electrically connected with a system bus 2060.

In the event that the computer system 2000 is a mobile device, a battery may be further included to supply an operating voltage of the computer system 2000. Although not shown in FIG. 18, the computer system 2000 may further include an application chipset, a camera image processor (CIS), a mobile DRAM, and the like.

A temperature control method in which a body bias regulating operation and a thermal throttling operation are performed in parallel may be applied to components such as the nonvolatile memory 2010, the CPU 2020, the RAM 2030, the user interface 2040, and the modem 2050.

A semiconductor device according to the inventive concepts may be mounted in various types of packages. Examples of the packages of the semiconductor device according to the inventive concepts may include Package on Package (PoP), Ball Grid Arrays (BGAs), Chip Scale Packages (CSPs), Plastic Leaded Chip Carrier (PLCC), Plastic Dual In-line Package (PDIP), Die in Waffle Pack, Die in Wafer Form, Chip On Board (COB), Ceramic Dual In-line Package (CERDIP), Plastic Metric Quad Flat Pack (MQFP), Thin Quad Flat Pack (TQFP), Small Outline Integrated Circuit (SOIC), Shrink Small Outline Package (SSOP), Thin Small Outline Package (TSOP), System In Package (SIP), Multi Chip Package (MCP), Wafer-level Fabricated Package (WFP), and Wafer-level Processed Stack Package (WSP).

The inventive concept can also be embodied as programmed commands to be executed in various computers and processors, and recorded to a computer-readable recording medium. The computer-readable recording medium may include one or more of the programmed commands, data files, data structures, or the like. The programmed commands recorded to the computer-readable recording medium may be particularly designed or configured for the inventive concept or may be well known to one of ordinary skill in the art. Examples of the computer-readable recording medium include magnetic media including hard disks, magnetic tapes, and floppy disks, optical media including CD-ROMs, and DVDs, magneto-optical media including floptical disks, and a hardware apparatus designed to store and execute the programmed commands in read-only memory (ROM), random-access memory (RAM), flash memory, and the like. Examples of the programmed commands include not only machine codes generated by a compiler but also include great codes to be executed in a computer by using an interpreter. The hardware apparatus can be configured to function as one or more software modules so as to perform operations for the invention, or vice versa.

While exemplary embodiments have been described, it will be apparent to those skilled in the art that various changes and modifications may be made without departing from the spirit and scope of the inventive concept. Therefore, it should be understood that the above embodiments are not limiting, but illustrative.

What is claimed is:

1. A method of controlling a temperature of a semiconductor device, comprising:

detecting, by a temperature sensor, a temperature of the semiconductor device;

activating a reverse body biasing operation in which, in response to determining that the detected temperature is greater than a first temperature level, a body bias voltage applied to a substrate of a function block of the semiconductor device is regulated; and activating a thermal throttling operation in which, in response to determining that the detected temperature is greater than a second level that is different than the first temperature level, at least one frequency of a driving clock is provided to the function block of the semiconductor device and a driving voltage applied to the function block of the semiconductor device is regulated.

2. The method of claim 1, wherein the reverse body biasing operation and the thermal throttling operation are performed simultaneously when the detected temperature is greater than both of the first temperature level and the second temperature level.

3. The method of claim 2, wherein the second temperature level is greater than the first temperature level.

4. The method of claim 2, wherein the first temperature level is greater than the second temperature level.

5. The method of claim 1, wherein the activating the thermal throttling operation comprises performing the thermal throttling operation in one of a plurality of modes and each of the plurality of modes specifies a different level of the frequency of the driving clock and a different level of the driving voltage, respectively.

6. The method of claim 5, wherein the body bias voltage is changed to different levels in response to the plurality of modes, respectively.

7. The method of claim 1, wherein the function block comprises a plurality of sub blocks according operating properties and a level of a body bias voltage provided to at least one of the plurality of sub blocks is different from a level of a body bias voltage applied to the remaining sub blocks.

8. A method of controlling a temperature of a semiconductor device, comprising:

detecting, by a temperature sensor, a temperature of the semiconductor device;

setting a thermal throttling mode to one of a plurality of different thermal throttling modes based on the detected temperature; and performing a thermal throttling operation and a reverse body biasing operation according to the set thermal throttling mode, wherein in the thermal throttling operation, a driving voltage and a frequency of a driving clock provided to a function block of the semiconductor device are adjusted according to the set thermal throttling mode, and in the reverse body biasing operation, a body bias voltage applied to a substrate of the function block of the semiconductor device is adjusted according to the set thermal throttling mode.

9. The method of claim 8, wherein the setting the thermal throttling mode comprising setting the thermal throttling mode based on at least one of a driving performance of the semiconductor device and a power dissipation of the semiconductor device.

10. The method of claim 9, wherein the plurality of thermal throttling modes comprise at least a first mode, a second mode and a third mode, and each of the first mode, the second mode and the third mode specifies a different level of the frequency of the driving clock and a different level of the driving voltage.

11. The method of claim 10, wherein in the performing the reverse body biasing operation, the body bias voltage is set to different levels in accordance with the plurality of modes, respectively.

12. The method of claim 10, wherein the performing the reverse body biasing operation comprises:

setting the level of the body bias voltage to a first level when the thermal throttling mode is set to the first mode;

setting the level of the body bias voltage to a second level when the thermal throttling mode is set the second mode; and setting the level of the body bias voltage to a third level when the thermal throttling mode is set to the third mode, and wherein the first level is greater than the second level, and the second level is greater than the third level.

13. The method of claim 8, wherein the function block comprises a plurality of sub blocks according to operating properties and a level of a body bias voltage provided to at least one of the plurality of sub blocks is different from a level of a body bias voltage applied to the remaining sub blocks.

14. A system on chip comprising:

a plurality of transistors disposed on a substrate;

a body bias generator-configured to provide a body bias voltage to the substrate; and a controller configured to control the body bias generator to activate a reverse body biasing operation in which the body bias voltage provided by the body bias generator is regulated in response to determining that a temperature of the system on chip is greater than a first temperature level, and configured to activate a thermal throttling operation in which at least one frequency of a driving clock applied to the plurality of transistors and at least one driving voltage applied to the plurality of transistors are regulated in response to determining the temperature of the system on chip is greater than a second temperature level that is different than the first temperature level.

15. The system on chip of claim 14, wherein the reverse body biasing operation and the thermal throttling operation are performed simultaneously when the detected temperature is greater than both of the first temperature level and the second temperature level.

16. The system on chip of claim 15, wherein the second temperature level is greater than the first temperature level.

17. The system on chip of claim 15, wherein the first temperature level is greater than the second temperature level.

18. The system on chip of claim 15, wherein the controller performs the thermal throttling operation in one of a plurality of modes, and each of the plurality of modes specify a different level of the frequency of the driving clock and a different level of the driving voltage.

19. The system on chip of claim 18, wherein the controller controls the body bias generator to change the body bias voltage to different levels in response to the plurality of modes, respectively.

20. The system on chip of claim 15, further comprising:

a temperature sensor which measures the temperature of the system on chip and provides the measured temperature to the controller.

21. The system on chip of claim 15, further comprising:

a performance monitor which measures a performance of the system on chip and provides the measured performance to the controller, wherein the controller is further configured to adjust a level of reverse body biasing operation in accordance with the measured performance.

22. A system on chip comprising:
a plurality of transistors disposed on a substrate;
a body bias generator configured to provide a body bias voltage to the substrate; and
a controller configured to set a thermal throttling mode to one of a plurality of different thermal throttling modes, configured to activate a thermal throttling operation and a reverse body biasing operation according to the set thermal throttling mode, wherein in the thermal throttling operation, at least one driving voltage and at least one frequency of a driving clock provided to the plurality of transistors are changed according to the set thermal throttling mode, and in the reverse body biasing operation, the body bias voltage applied to the plurality of transistors is set according to the set thermal throttling mode, and
configured to control the body bias generator to adjust a level of the set bias voltage applied to the plurality of transistors based on a temperature of the system on chip.

23. The system on chip of claim 22, wherein the controller sets the thermal throttling mode based on at least one of a driving performance of the system on chip and a power dissipation of the system on chip.

24. The system on chip of claim 22, wherein the plurality of thermal throttling modes comprise at least a first mode, a second mode and a third mode, and each of the first mode, the second mode and the third mode specifies a different level of the frequency of the driving clock and a different level of the driving voltage.

25. The system on chip of claim 24, wherein the body bias voltage is set to different levels in accordance with the plurality of modes, respectively.

26. The system on chip of claim 25, wherein the controller controls the body bias generator to set the level of the body bias voltage to a first level when the thermal throttling mode is set to the first mode, controls the body bias generator to set the level of the body bias voltage to a second level when the thermal throttling mode is set the second mode, and controls the body bias generator to set the level of the body bias voltage to a third level when the thermal throttling mode is set to the third mode, and
wherein the first level is greater than the second level, and the second level is greater than the third level.

27. The system on chip of claim 22, further comprising:
a temperature sensor which measures the temperature of the system on chip and provides the measured temperature to the controller.

28. The system on chip of claim 23, further comprising:
a performance monitor which measures a performance of the system on chip and provides the measured performance to the controller,
wherein the measured performance comprises at least one of the driving performance of the system on chip and the power dissipation of the system on chip.

29. A non-transitory computer-readable recording medium storing a computer-readable program that when executed by a computer performs the temperature control method of claim 1.

30. A non-transitory computer-readable recording medium storing a computer-readable program that when executed by a computer performs the temperature control method of claim 8.

31. A system on chip comprising:
a temperature sensor-configured to measure a temperature of the system on chip;
a plurality of transistors disposed on a substrate;
a clock generator configured to provide a driving clock signal to the plurality of transistors;
a power manager configured to provide a driving voltage to the plurality of transistors;
a body bias generator configured to provide a body bias voltage to the substrate; and
a controller configured to control the body bias generator to activate a reverse body biasing operation in which the body bias voltage provided by the body bias generator is regulated in response to determining that the measured temperature of the system on chip is greater than a first temperature level, and configured to control the clock generator and the power manager to activate a thermal throttling operation in which at least one frequency of the driving clock signal provided to the plurality of transistors and at least one driving voltage provided to the plurality of transistors are regulated when the measured temperature of the system on chip is greater than a second temperature level that is different than the first temperature level,
wherein the reverse body biasing operation and the thermal throttling operation are performed simultaneously when the measured temperature is greater than both of the first temperature level and the second temperature level.

* * * * *